US009536122B2

(12) United States Patent
Potyrailo

(10) Patent No.: US 9,536,122 B2
(45) Date of Patent: Jan. 3, 2017

(54) DISPOSABLE MULTIVARIABLE SENSING DEVICES HAVING RADIO FREQUENCY BASED SENSORS

(71) Applicant: General Electric Company, Schenectady, NY (US)

(72) Inventor: Radislav Alexandrovich Potyrailo, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 78 days.

(21) Appl. No.: 14/532,168

(22) Filed: Nov. 4, 2014

(65) Prior Publication Data

US 2016/0125210 A1 May 5, 2016

(51) Int. Cl.
*G06K 7/10* (2006.01)
*H04Q 9/00* (2006.01)

(52) U.S. Cl.
CPC ............ *G06K 7/10366* (2013.01); *H04Q 9/00* (2013.01); *H04Q 2209/40* (2013.01); *H04Q 2209/47* (2013.01)

(58) Field of Classification Search
CPC ..... G06R 7/10; G06R 7/100366; G06F 15/00; G06F 17/18; G01R 27/02; G01N 27/02; G01N 29/02; G01N 27/00; G01N 33/48; G01D 7/02; G06K 7/10; G06K 7/10366
USPC ............ 340/10.1–10.5; 702/19, 23; 324/682, 324/71.1; 73/866.1
See application file for complete search history.

(56) References Cited

U.S. PATENT DOCUMENTS

| | | | |
|---|---|---|---|
| 3,675,121 | A | 7/1972 | Thompson |
| 3,778,706 | A | 12/1973 | Thompson |
| 3,927,369 | A | 12/1975 | Billeter et al. |
| 4,096,385 | A | 6/1978 | Marett |
| 4,273,636 | A | 6/1981 | Shimada et al. |
| 4,275,364 | A | 6/1981 | Skatvold |
| 4,372,164 | A | 2/1983 | Brown et al. |
| 4,553,434 | A | 11/1985 | Spaargaren |

(Continued)

FOREIGN PATENT DOCUMENTS

| | | | |
|---|---|---|---|
| CN | 101022760 | A | 8/2007 |
| CN | 101057124 | A | 10/2007 |

(Continued)

OTHER PUBLICATIONS

Potyrailo et al., "Selective Detection of Chemical Species in Liquids and Gases using Passive Radio-Frequency Identification (RFID) Sensors", Proc. Transducers, pp. 1650-1653, 2009.

(Continued)

*Primary Examiner* — Allen T Cao
(74) *Attorney, Agent, or Firm* — Eileen B. Gallagher

(57) ABSTRACT

A multivariable sensing device for sensing one or more parameters of a process fluid disposed in a container is provided. The multivariable sensing device includes a radio frequency based sensor configured to sense a physical parameter, a chemical parameter, a biological parameter, or combinations thereof, representative of the process fluid. The radio frequency based sensor includes a sensor substrate, a radio frequency coil disposed on at least a portion of the sensor substrate, and a support structure configured to be physically coupled to the container. Further, the support structure is configured to position the radio frequency based sensor in operative proximity to an inside of the container.

18 Claims, 10 Drawing Sheets

(56) References Cited

U.S. PATENT DOCUMENTS 4,728,892 A 3/1988 Vinegar et al.
4,820,989 A 4/1989 Vail, III
4,844,097 A 7/1989 Bellhouse et al.
4,876,512 A 10/1989 Kroeger et al.
4,882,542 A 11/1989 Vail, III
4,887,455 A 12/1989 Payne et al.
4,922,745 A 5/1990 Rudkin et al.
4,941,958 A 7/1990 Byers
4,965,522 A 10/1990 Hazen et al.
4,996,490 A 2/1991 Scott et al.
5,010,301 A 4/1991 Leung et al.
5,025,346 A 6/1991 Tang et al.
5,059,790 A 10/1991 Klainer et al.
5,089,780 A 2/1992 Megerle
5,157,338 A 10/1992 Motherbaugh et al.
5,208,165 A 5/1993 Law et al.
5,241,364 A 8/1993 Kimura
5,260,569 A 11/1993 Kimura
5,344,547 A 9/1994 Vlasov et al.
5,421,983 A 6/1995 Slack et al.
5,443,985 A 8/1995 Lu et al.
5,497,140 A 3/1996 Tuttle
5,591,896 A 1/1997 Lin
5,592,040 A 1/1997 Yamamoto
5,607,566 A 3/1997 Brown et al.
5,646,592 A 7/1997 Tuttle
5,672,319 A 9/1997 Eisum
5,744,902 A 4/1998 Vig
5,751,475 A 5/1998 Ishiwata et al.
5,754,055 A 5/1998 McAdoo et al.
5,785,181 A 7/1998 Quartararo, Jr.
5,786,595 A 7/1998 Herron et al.
5,817,943 A 10/1998 Welles, II et al.
5,831,439 A 11/1998 Suenram et al.
5,840,168 A 11/1998 Chaniotakis et al.
5,874,047 A 2/1999 Schoning et al.
5,961,923 A 10/1999 Nova et al.
6,025,725 A 2/2000 Gershenfeld et al.
6,025,783 A 2/2000 Steffens, Jr.
6,166,546 A 12/2000 Scheihing et al.
6,189,656 B1 2/2001 Morgenstern et al.
6,192,753 B1 2/2001 Czarnek
6,204,764 B1 3/2001 Maloney
6,278,379 B1 8/2001 Allen et al.
6,287,765 B1 9/2001 Cubicciotti
6,359,444 B1 3/2002 Grimes
6,360,585 B1 3/2002 Potyrailo et al.
6,398,931 B1 6/2002 Burchette et al.
6,399,375 B2 6/2002 Vajta
6,406,668 B1 6/2002 Dordick et al.
6,461,872 B1 10/2002 Sivavec et al.
6,471,838 B1 10/2002 Igel et al.
6,506,346 B1 1/2003 Monro
6,532,834 B1 3/2003 Pinto et al.
6,544,193 B2 * 4/2003 Abreu .................. A61B 3/1241
600/558
6,586,946 B2 7/2003 Hefti et al.
6,614,229 B1 9/2003 Clark et al.
6,657,429 B1 12/2003 Goldfine et al.
6,672,512 B2 1/2004 Bridgelall
6,676,903 B2 1/2004 Potyrailo et al.
6,730,201 B1 5/2004 Kuhlman et al.
6,751,557 B1 6/2004 Shehab et al.
6,773,926 B1 8/2004 Freund et al.
6,780,307 B2 8/2004 Kidwell
6,782,736 B1 8/2004 Hammer
6,804,544 B2 10/2004 Van Antwerp et al.
6,818,450 B2 11/2004 Eaton et al.
6,864,801 B2 3/2005 Tabanou et al.
6,891,383 B2 5/2005 Nicholson et al.
6,953,520 B2 10/2005 Yengoyan et al.
7,017,404 B1 3/2006 Kain
7,031,560 B2 4/2006 Lelong-Feneyrou et al.
7,034,660 B2 4/2006 Watters et al.
7,038,470 B1 5/2006 Johnson
7,040,139 B2 5/2006 Sunshine
7,076,858 B2 7/2006 Eckstein et al.
7,113,125 B2 9/2006 Le Sesne
7,125,382 B2 10/2006 Zhou et al.
7,126,013 B2 10/2006 Heeney et al.
7,168,310 B2 1/2007 Al-Ruwaili
7,171,312 B2 1/2007 Steinthal et al.
7,178,416 B2 2/2007 Whelan et al.
7,204,128 B1 4/2007 Liu et al.
7,252,010 B2 8/2007 Ohta et al.
7,276,916 B2 10/2007 Hammer
7,293,450 B2 11/2007 Liu et al.
7,317,989 B2 1/2008 DiFoggio et al.
7,335,336 B1 2/2008 Kim
7,350,367 B2 4/2008 Matsiev et al.
7,434,457 B2 10/2008 Goodwin et al.
7,445,143 B2 11/2008 Pang et al.
7,449,893 B1 11/2008 Tsironis
7,455,108 B2 11/2008 Jenkins et al.
7,456,744 B2 11/2008 Kuhns et al.
7,466,041 B2 12/2008 Urman
7,481,771 B2 1/2009 Fonseca et al.
7,483,743 B2 1/2009 Mann et al.
7,486,495 B1 2/2009 Diederichs et al.
7,495,454 B2 2/2009 Rivera
7,523,647 B2 4/2009 Scott
7,562,557 B2 7/2009 Bennett et al.
7,569,810 B1 8/2009 Troxler et al.
7,629,167 B2 12/2009 Hodge et al.
7,677,307 B2 3/2010 Vasques et al.
7,691,329 B2 4/2010 Potyrailo et al.
7,697,574 B2 4/2010 Suematsu et al.
7,808,235 B2 10/2010 Rollins et al.
7,812,609 B2 10/2010 Martinez et al.
7,911,345 B2 3/2011 Potyrailo et al.
7,948,385 B2 5/2011 Potyrailo et al.
7,958,772 B2 6/2011 Permuy et al.
7,969,307 B2 6/2011 Peeters
8,018,342 B2 9/2011 Monk et al.
8,063,648 B2 11/2011 Nilsson et al.
8,111,143 B2 2/2012 Tong et al.
8,154,389 B2 4/2012 Rowland et al.
8,159,347 B2 4/2012 Potyrailo et al.
8,184,290 B2 5/2012 Hertens et al.
8,190,394 B2 5/2012 Davis et al.
8,246,910 B2 8/2012 Dhirani et al.
8,261,618 B2 9/2012 Engle et al.
8,318,099 B2 11/2012 Potyrailo et al.
8,342,242 B2 1/2013 Roddy et al.
8,429,985 B2 4/2013 Furlong
8,452,716 B2 5/2013 Howley et al.
8,508,368 B2 8/2013 Potyrailo et al.
8,547,110 B2 10/2013 Kesil et al.
8,643,388 B2 2/2014 Hedges
8,710,973 B2 4/2014 Schneider et al.
8,732,938 B2 5/2014 Kolosov et al.
8,833,145 B2 9/2014 Fischer et al.
8,933,706 B1 1/2015 Karlquist
8,936,191 B2 * 1/2015 Potyrailo ........... G01N 33/0073
235/380
8,952,708 B2 2/2015 Nikolenko
2001/0045355 A1 11/2001 Gephart et al.
2002/0050929 A1 5/2002 Parrotta et al.
2002/0081231 A1 6/2002 Shapiro et al.
2002/0089356 A1 7/2002 Perrott et al.
2002/0149466 A1 10/2002 Sunshine et al.
2002/0173040 A1 11/2002 Potyrailo et al.
2002/0177232 A1 11/2002 Melker et al.
2002/0197725 A1 12/2002 Eaton et al.
2003/0053936 A1 3/2003 Potyrailo et al.
2003/0154031 A1 8/2003 Potyrailo et al.
2003/0179024 A1 9/2003 Montagnana
2003/0232223 A1 12/2003 Leddy et al.
2004/0051154 A1 3/2004 Yamakawa et al.
2004/0113790 A1 6/2004 Hamel et al.
2004/0125442 A1 7/2004 Yun et al.
2004/0155667 A1 8/2004 Kesil et al.
2004/0219523 A1 11/2004 Stanton et al.
2004/0227682 A1 11/2004 Anderson

(56) References Cited

U.S. PATENT DOCUMENTS

2004/0248315 A1 12/2004 Klein et al.
2005/0022581 A1 2/2005 Sunshine
2005/0058460 A1 3/2005 Wang
2005/0093760 A1 5/2005 Rochelle et al.
2005/0193832 A1 9/2005 Tombs et al.
2006/0014172 A1 1/2006 Muller et al.
2006/0020427 A1 1/2006 Kahn et al.
2006/0055531 A1 3/2006 Cook et al.
2006/0081471 A1 4/2006 Kidwell
2006/0133720 A1 6/2006 Hochberg et al.
2006/0141469 A1 6/2006 Rossier et al.
2006/0198760 A1 9/2006 Potyrailo et al.
2006/0205093 A1 9/2006 Prins
2006/0210440 A1 9/2006 Potyrailo et al.
2006/0238349 A1 10/2006 Hu et al.
2006/0265150 A1 11/2006 Hu et al.
2007/0029195 A1 2/2007 Li et al.
2007/0064839 A1 3/2007 Luu
2007/0084277 A1 4/2007 Steinsiek
2007/0085686 A1 4/2007 Oz
2007/0090926 A1 4/2007 Potyrailo et al.
2007/0111222 A1 5/2007 Chasin et al.
2007/0131418 A1 6/2007 Barrow et al.
2007/0148670 A1 6/2007 O'Malley
2007/0176773 A1 8/2007 Smolander et al.
2007/0236338 A1 10/2007 Maruyama
2008/0012577 A1 1/2008 Potyrailo et al.
2008/0090926 A1 4/2008 Kang et al.
2008/0093219 A1 4/2008 Goldberg et al.
2008/0116908 A1 5/2008 Potyrailo et al.
2008/0135614 A1 6/2008 Werner et al.
2008/0157901 A1 7/2008 Matekovits et al.
2008/0177150 A1 7/2008 Ii et al.
2008/0179197 A1 7/2008 Wu
2008/0180249 A1 7/2008 Butler et al.
2008/0184787 A1 8/2008 Coates
2008/0191859 A1 8/2008 Tiek et al.
2008/0236814 A1 10/2008 Roddy
2008/0280374 A1 11/2008 Potyrailo et al.
2009/0035856 A1 2/2009 Galliher et al.
2009/0039864 A1 2/2009 Gordon
2009/0087862 A1 4/2009 Carter et al.
2009/0095073 A1 4/2009 Fukumura et al.
2009/0104707 A1 4/2009 Wang et al.
2009/0120169 A1 5/2009 Chandler et al.
2009/0204250 A1 8/2009 Potyrailo et al.
2009/0215646 A1 8/2009 Anslyn et al.
2009/0256679 A1 10/2009 Potyrailo et al.
2009/0265037 A1 10/2009 Bassa
2009/0289776 A1 11/2009 Moore et al.
2009/0308155 A1 12/2009 Zhang
2010/0021993 A1 1/2010 Wang et al.
2010/0042338 A1 2/2010 Giurgiutiu et al.
2010/0059221 A1 3/2010 Vannuffelen et al.
2010/0075405 A1 3/2010 Broadley
2010/0138267 A1 6/2010 Vittal et al.
2010/0153323 A1 6/2010 Hennessy et al.
2010/0231407 A1 9/2010 Carr
2010/0250170 A1 9/2010 Kalinin et al.
2010/0261226 A1 10/2010 Niazi
2010/0295558 A1 11/2010 Eberheim et al.
2011/0006878 A1 1/2011 Nyffeler et al.
2011/0006900 A1 1/2011 Nyffeler et al.
2011/0012736 A1 1/2011 Potyrailo et al.
2011/0018649 A1 1/2011 David et al.
2011/0029156 A1 2/2011 Vernacchia et al.
2011/0045601 A1 2/2011 Gryska et al.
2011/0051775 A1 3/2011 Ivanov et al.
2011/0101996 A1* 5/2011 Potyrailo ............... G01D 21/00 324/655
2011/0117538 A1 5/2011 Niazi
2011/0152706 A1 6/2011 Christopherson et al.
2011/0152750 A1* 6/2011 Dacey, Jr. ................. A61F 2/30 604/21
2011/0156177 A1 6/2011 Merz
2011/0160681 A1* 6/2011 Dacey, Jr. ............. A61L 2/0011 604/265
2011/0221667 A1 9/2011 Lee
2011/0248825 A1 10/2011 Hamel et al.
2011/0263036 A1 10/2011 Blauw et al.
2011/0282540 A1 11/2011 Armitage et al.
2011/0283821 A1* 11/2011 Ober .................. G01N 33/0031 73/866.1
2011/0320142 A1 12/2011 Surman et al.
2012/0001730 A1 1/2012 Potyrailo et al.
2012/0025526 A1 2/2012 Luo et al.
2012/0231504 A1 9/2012 Niazi
2012/0258441 A1 10/2012 Gebauer et al.
2012/0265036 A1 10/2012 Estes et al.
2012/0289757 A1 11/2012 Boyden et al.
2013/0060112 A1 3/2013 Pryor et al.
2013/0182819 A1 7/2013 Dvorkin et al.
2013/0285677 A1 10/2013 Hammer
2014/0002111 A1 1/2014 Potyrailo et al.
2015/0115983 A1* 4/2015 Potyrailo ........... G01N 33/1893 324/693
2015/0185173 A1* 7/2015 Potyrailo ............... G01N 27/02 435/39
2016/0018381 A1* 1/2016 Potyrailo ............. G01N 27/026 324/633
2016/0187277 A1* 6/2016 Potyrailo ........... G01N 33/2888 324/633

FOREIGN PATENT DOCUMENTS

CN 101988574 A 3/2011
CN 102022264 A 4/2011
CN 102422330 A 4/2012
CN 203923208 U 11/2014
EP 2498076 A1 9/2012
GB 793953 A 4/1958
JP 5774097 A 5/1982
JP 59116855 U 8/1984
JP 59160746 A 9/1984
JP 0381659 A 4/1991
JP 06194333 A 7/1994
JP 6086057 U 12/1994
JP 0773282 A 3/1995
JP 07120423 A 5/1995
JP 08509549 A 10/1996
JP 09292453 A 11/1997
JP 10504388 A 4/1998
JP 2000111547 A 4/2000
JP 2001502791 A 2/2001
JP 2002125206 A 4/2002
JP 2003503011 A 1/2003
JP 2003506706 A 2/2003
JP 2003161637 A 6/2003
JP 2005156569 A 6/2005
JP 2006516721 A 7/2006
JP 2007516509 A 6/2007
JP 2008129009 A 6/2008
JP 2008236617 A 10/2008
JP 2008298565 A 12/2008
JP 2009092633 A 4/2009
JP 2009540292 A 11/2009
WO 9845779 A1 10/1998
WO 0055583 A1 9/2000
WO 0060120 A2 10/2000
WO 0173380 A1 10/2001
WO 0212129 A1 2/2002
WO 0223176 A1 3/2002
WO 03050529 A1 6/2003
WO 2007075619 A1 7/2007
WO 2007101992 A1 9/2007
WO 2013057630 A1 4/2013

OTHER PUBLICATIONS

McCann et al., "Recent Advances in Lateral Field Excited and Monolithic Spiral Coil Acoustic Transduction Bulk Acoustic Wave

(56) References Cited

OTHER PUBLICATIONS

Sensor Platforms", Measurement Science and Technology, vol. 20, Issue No. 12, 2009.
Sweden Office Action issued in connection with corresponding SE Application No. 0702495-3 on Jan. 26, 2009.
Potyrailo et al., "Development of Radio-Frequency Identification Sensors Based on Organic Electronic Sensing Materials for Selective Detection of Toxic Vapors", Journal of Applied Physics, vol. 106, Issue No. 12, pp. 124902-1 to124902-6, 2009.
Jaworski et al., "On-line Measurement of Separation Dynamics in Primary Gas/Oil/Water Separators: Challenges and Technical Solutions—A review", Petroleum Science and Engineering, vol. 68, pp. 47-59, 2009.
Potyrailo et al., "Combinatorial Screening of Polymeric Sensing Materials Using RFID Sensors",Journal of Combinatorial Chemistry, vol. 11, Issue No. 4, pp. 598-603, 2009.
Westafer et al., "Functionalization of High Frequency SAW RFID Devices for Ozone Doslmetry", IEEE Sensors, pp. 1747-1752, Oct. 25-28, 2009.
Sweden Office Action issued in connection with corresponding SE Application No. 0702495-3 on Sep. 29, 2009.
PCT Search Report and Written Opinion issued in connection with corresponding PCT Application No. PCT/SE2009/051346 on Mar. 15, 2010.
US Non-Final Rejection issued in connection with corresponding U.S. Appl. No. 11/560,476 on Apr. 5, 2010.
Potyrailo et al. "Integration of Passive Multivariable RFID Sensors into Single-Use Biopharmaceutical Manufacturing Components", RFID, 2010 IEEE International, pp. 1-7, Apr. 2010.
Potyrailo et al., "Selective Quantitation of Vapors and their Mixtures using Individual Passive Multivariable RFID Sensors", RFID, 2010 IEEE International, pp. 22-28, Apr. 2010.
Becher et al., "The Detection of Evaporating Hazardous Material Released from Moving Sources Using a Gas Sensor Network", Sensors and Actuators B: Chemical, vol. 146, Issue No. 2, pp. 513-520, Apr. 29, 2010.
Hong et al., "Development of a Micro Liquid-Level Sensor for Harsh Environments using a Periodic Heating Technique", Measurement Science and Technology, vol. 21, Issue No. 10, 2010.
Potyrailo et al., "Passive Radio Frequency Identification (RFID) Chemical Sensors for Homeland Security Applications", In Wiley Handbook of Science and Technology for Homeland Security, vol. 1, pp. 523-544, 2010.
Wang et al., "Flexible Chemiresistor Sensors: Thin film Assemblies of Nanoparticles on a Polyethylene Terephthalate Substrate", Journal of Materials Chemistry, vol. 20, pp. 907-915, 2010.
Alexander et al., "Optimization of Interdigitated Electrode (IDE) Arrays for Impedance Based Evaluation of Hs 578T Cancer Cells", Journal of Physics: Conference Series, vol. 24, Issue No. 1, pp. 1-4, 2010.
Bobrov et al., "The Effect of Clay and Organic Matter Content on the Dielectric Permittivity of Soils and Grounds at the Frequency Range from 10 MHz to 1 GHz", International Geoscience and Remote Sensing Symposium (IGARSS), pp. 4433-4435, Jul. 25-30, 2010.
Chen et al., "Based on ZigBee Wireless Sensor Network the Monitoring System Design for Production Process Toxic and Harmful Gas", International Conference on Computer, Mechatronics, Control and Electronic Engineering, vol. 4, pp. 425-428, 2010.
Cho et al., "Capacitive Sensor for Automotive Engine Oil Degradation using Wireless Network", International Symposium on Advanced Packaging Materials: Microtech, APM '10 , pp. 88-91, 2010.
De Vito et al., "Wireless Sensor Networks for Distributed Chemical Sensing: Addressing Power Consumption Limits with On-Board Intelligence", IEEE Sensors Journal, vol. 11, Issue No. 14, pp. 947-955, 2010.
Bianchi et al., "Model of an Interdigitated Microsensor to Detect and Quantify Cells Flowing in a Test Chamber", 6th annual COMSOL Conference Paris, pp. 1-5, Nov. 2010.
Suresh et al., "Piezoelectric Based Resonant Mass Sensor using Phase Measurement", Measurement, vol. 44, Issue No. 2, pp. 320-325, Feb. 2011.
Perez et al., "Low-Cost Oil Quality Sensor Based on Changes in Complex Permittivity", Sensors, vol. 11, pp. 10675-10690, 2011.
Potyrailo et al. "RFID Sensors as the Common Sensing Platform for Single-Use Biopharmaceutical Manufacturing", Measurement Science and Technology, vol. 22, 2011.
Potyrailo et al., "Passive Multivariable Temperature and Conductivity RFID Sensors for Single-Use Biopharmaceutical Manufacturing Components", Biotechnology Progress, vol. 27, Issue No. 3, pp. 875-884, May 2011.
Owenier et al., "Dielectric Permittivity of Geologic Materials at Different Water Contents—Measurements with an Impedance Analyzer", 6th International Workshop on Advanced Ground Penetrating Radar (IWAPGR), pp. 1-5, Jun. 22-24, 2011.
Potyrailo et al., "Multivariable Passive RFID Vapor Sensors: Pilot-Scale Manufacturing and Laboratory Evaluation", IEEE International Conference on RFID, Poster 52, 2011.
US Non-Final Rejection issued in connection with corresponding U.S. Appl. No. 12/424,016 on Jul. 12, 2011.
Guan et al.,"Application of Dielectric Spectroscopy for Engine Lubricating Oil Degradation Monitoring", Sensors and Actuators A: Physical, vol. 168, Issue No. 1, pp. 22-29, Jul. 2011.
Wang et al., "Impedance Analysis for Lateral Field Excited Acoustic Wave Sensors", Sensors and Actuators B: Chemical, vol. 156, Issue No. 2, pp. 969-975, Aug. 2011.
Sen et al., "Evaluation of Sensor Arrays for Engine Oils Using Artificial Oil Alteration", Proceedings of SPIE 8066, Smart Sensors Actuators and MEMS V, 2011.
Latif et al., "Conductometric Sensors for Monitoring Degradation of Automotive Engine Oil", Sensors, vol. 11, Issue No. 9, pp. 8611-8625, Sep. 2011.
PCT Search Report and Written Opinion issued in connection with corresponding PCT Application No. PCT/SE2011/050748 on Oct. 5, 2011.
PCT Search Report and Written Opinion issued in connection with corresponding PCT Application No. PCT/SE2011/050818 on Oct. 24, 2011.
Potyrailo et al., "Materials and Transducers Toward Selective Wireless Gas Sensing", Chemical Reviews, vol. 111, Issue No. 11, pp. 7315-7354, Nov. 9, 2011.
Datla et al., "Wireless Distributed Computing: A Survey of Research Challenges", IEEE Communications Magazine, vol. 50, Issue No. 1, pp. 144-152, Jan. 2012.
Vasilyeva et al., "Differences in Behaviour of Adsorbed Water in Kaolinites and Montmorillonites in Temperature Range from −90° C. to +140° C. by Dielectric Spectroscopy", Physics: Conference Series, vol. 394, Issue No. 1, pp. 1-6, 2012.
Aghayan, "On-Line Monitoring of Engine Health through the Analysis of Contaminants in Engine Lubricant", The School of Graduate and Postdoctoral Studies The University of Western Ontario London, Ontario, Canada, pp. 1-273, 2012.
US Non-Final Rejection issued in connection with corresponding U.S. Appl. No. 12/824,436 on Aug. 8, 2012.
Fochtmann et al., "Optimization of the Lateral Field Excited Platform for Liquid Sensing Applications", Sensors and Actuators B: Chemical, vol. 170, pp. 95-103, Jul. 1, 2012.
US Non-Final Rejection issued in connection with corresponding U.S. Appl. No. 11/560,476 on Jul. 5, 2012.
Datla et al., "Wireless Distributed Computing in Cognitive Radio Networks", Ad Hoc Networks, vol. 10, Issue No. 05, pp. 845-857, Jul. 2012.
Unofficial English Translation of Japanese Office Action issued in connection with corresponding JP Application No. 2007291481 on Aug. 7, 2012.
US Non-Final Rejection issued in connection with corresponding U.S. Appl. No. 13/331,003 on Sep. 10, 2012.
US Notice of Allowance issued in connection with corresponding U.S. Appl. No. 12/424,016 on Sep. 28, 2012.

(56) References Cited

OTHER PUBLICATIONS

Chinese Office Action issued in connection with corresponding CN Application No. 200980149087.6 on Sep. 13, 2012.
US Non-Final Rejection issued in connection with corresponding U.S. Appl. No. 12/325,653 on Nov. 16, 2012.
US Non-Final Rejection issued in connection with corresponding U.S. Appl. No. 12/977,599 on Feb. 5, 2013.
US Final Rejection issued in connection with corresponding U.S. Appl. No. 12/824,436 on Feb. 6, 2013.
Morris et al., "Wireless Sensor Array System for Combinatorial Screening of Sensor Materials", Combinatorial Methods and Informatics in Materials Science, vol. 894, pp. 219-224, 2006.
Yang et al., "Chemical Identification Using an Impedance Sensor Based on Dispersive Charge Transport", Applied Physics Letters, vol. 88, pp. 1-3, 2006.
Pejcic et al., "Impedance Spectroscopy: Over 35 Years of Electrochemical Sensor Optimization", Electrochimica Acta, vol. 51, Issue No. 28, pp. 6217-6229, Sep. 15, 2006.
Benini et al., "Wireless Sensor Networks: Enabling Technology for Ambient Intelligence", Microelectronics Journal, vol. 37, Issue No. 12, pp. 1639-1649, Dec. 2006.
Bai et al., "Gas Sensors Based on Conducting Polymers", Sensors (Basel), vol. 7, Issue No. 3, pp. 267-307, Mar. 2007.
Casanella et al., "Continuous Liquid Level Measurement Using a Linear Electrode Array", Measurement Science and Technology, vol. 18, Issue No. 7, pp. 178-184, May 9, 2007.
Liu et al., "Measurement of Density and Viscosity of Dodecane and Decane with a Piezoelectric Tuning Fork Over 298-448 K and 0.1-137.9 MPa", Sensors and Actuators A Physical, vol. 167, Issue No. 2, pp. 347-353, Jun. 2007.
Lu et al., "MEMS-Based Inductively Coupled RFID Transponder for Implantable Wireless Sensor Applications", IEEE Transactions on Magnetics, vol. 43, Issue No. 6, pp. 2412-2414, 2007.
Potyrailo et al., "Multianalyte Chemical Identification and Quantitation Using a Single Radio Frequency Identification Sensor", Analytical Chemistry, vol. 79, Issue No. 1, pp. 45-51, 2007.
Potyrailo et al., "Wireless Resonant Sensor Array for High-Throughput Screening of Materials", Review of Scientific Instruments, vol. 78, 2007.
Sugiyasu et al., "Conducting-Polymer-Based Chemical Sensors: Transduction Mechanisms", Bulletin of the chemical Society of Japan, vol. 80, pp. 2074-2083, 2007.
Tan et al., "A Wireless, Passive Sensor for Quantifying Packaged Food Quality", Sensors, vol. 7, Issue No. 9, pp. 1747-1756, 2007.
Gutzeit, "Controlling Crude Unit Overhead Corrosion—Rules of Thumb for Better Crude Desalting", NACE International Corrosion Conference Series, pp. 075671-0756721, 2007.
Hua et al., "Gas sensor based conducting polymers", Sensors, vol. 7, pp. 267-307, 2007.
Hwang et al., "Photoelectron Spectroscopic Study of the Electronic Band Structure of Polyfluorene and Fluorene-Arylamine Copolymers at Interfaces", The Journal of Physical Chemistry C, vol. 111, Issue No. 3, pp. 1378-1384, 2007.
Armani et al., "Single-Molecule Detection with Optical Microcavities", Science, vol. 317, Issue No. 5839, pp. 783-787, Aug. 10, 2007.
Hempel et al., "5D-2 Application of a Portable RF Impedance Spectrum Analyzer for the Investigation of Lateral Field Excited Acoustic Wave Sensors in a Liquid Environment", Ultrasonics Symposium, pp. 373-376, 2007.
Li et al., "Chemosensory Performance of Molecularly Imprinted Fluorescent Conjugated Polymer Materials", Journal of the American Chemical Society, vol. 129, Issue No. 51, pp. 15911-15918, 2007.
Li et al., "Inkjet Printed Chemical Sensor Array Based on Polythiophene Conductive Polymers", Sensors and Actuators B, vol. 123, pp. 651-660, 2007.
Wang et al., "A New Method for On-line Monitoring of Brake Fluid Condition using an Enclosed Reference Probe", Measurement Science and Technology, vol. 18, Issue No. 11, pp. 3625-3635, 2007.
Wang et al., "Array of Molecularly Mediated Thin Film Assemblies of Nanoparticles: Correlation of Vapor Sensing with Interparticle Spatial Properties", Journal of the American Chemical Society, vol. 129, Issue No. 7, pp. 2161-2170, 2007.
Wei et al., "Simple and Sensitive Aptamer-Based Colorimetric Sensing of Protein using Unmodified Gold Nanoparticle Probes", Chemical Communications, pp. 3735-3737, 2007.
Metzger et al., "Low-cost Weight-sensitive Foam to Monitor Product Availability on Retail Shelves", International Conference on Pervasive Computing (Pervasive2007), pp. 268-279, 2007.
Hewitt, "Oil/Water Interface Control for Desalters", Petroleum Technology Quarterly 2007, vol. 12, Issue No. 5, pp. 75-78, 2007.
Hwili et al., "Multi-Modality Multi-Interface Level Measurement", Physics: Conference Series, vol. 76, Issue No. 1, pp. 1-6, 2007.
Wang et al., "A Gold Nanoparticle-Based Aptamer Target Binding Readout for ATP Assay", Advanced Materials, vol. 19, Issue No. 22, pp. 3943-3946, Nov. 2007.
Tanaka et al., "Quartz Crystal Capacitive Sensor with Inductance-Capacitance Resonance Circuit for Vapor Sensing", Japanese Journal of Applied Physics, vol. 46, Issue No. 11, pp. 7509-7511, Nov. 2007.
Wang et al., "Aptamer Biosensor for Protein Detection using Gold Nanoparticles", Analytical Biochemistry, vol. 373, Issue No. 2, pp. 213-219, Feb. 15, 2008.
Wang et al., "Electrochemical Sensors for Clinic Analysis", Sensors (Basel), vol. 8, Issue No. 4, pp. 2043-2081, Apr. 2008.
Potyrailo et al., "Position-Independent Chemical Quantitation with Passive 13.56-Mhz Radio Frequency Identification (RFID) Sensors", Talanta, vol. 75, Issue No. 3, pp. 624-628, May 15, 2008.
Röck et al., "Electronic Nose: Current Status and Future Trends", Chemical Reviews, vol. 108, pp. 705-725, 2008.
Jimenez et al., "Surface Characterization of Clay Particles via Dielectric Spectroscopy", Annales Umcs, Chemistry, vol. 63, Issue No. 1, pp. 73-86, Jan. 2008.
Xiang-Hong et al., "Sensors and Biosensors for the Determination of Small Molecule Biological Toxins", Sensors, vol. 8, Issue No. 9, pp. 6045-6054, 2008.
Metzger et al., "Flexible-Foam-Based Capacitive Sensor Arrays for Object Detection at Low Cost", Applied Physics Letters, vol. 92, Issue No. 1, 2008.
Zheng et al., "Resonance Impedance Sensing of Human Blood Cells", Sensors and Actuators A: Physical, vol. 145-146, pp. 29-36, 2008.
Potyrailo et al., "Modeling of Selectivity of Multi-Analyte Response of Passive Radio Frequency Identification (RFID) Sensors", 12th International Meeting on Chemical Sensors, Columbus, 2008.
Hempel et al., "Lateral Field Excited Quartz Crystal Resonator Sensors for Determination of Acoustic and Electrical Properties of Liquids", IEEE International Frequency Control Symposium, pp. 705-710, 2008.
Potyrailo et al., "RFID Sensors based on Ubiquitous Passive 1356-MHz RFID Tags and Complex Impedance Detection", Wireless Communications and Mobile Computing, pp. 1-13, 2008.
Uid, "Ultrasonic Interface Level Detector", Christian Michelsen Research, 2008.
Capone et al., "Metal Oxide Gas Sensor Array for the Detection of Diesel Fuel in Engine Oil", Sensors and Actuators B: Chemical, vol. 131, pp. 125-133, 2008.
Diamond et al., "Wireless Sensor Networks and Chemo-/Biosensing", Chemical Reviews, vol. 108, Issue No. 2, pp. 652-679, 2008.
Hatchett et al., "Composites of Intrinsically Conducting Polymers as Sensing Nanomaterials", Chemical Reviews, vol. 108, Issue No. 2, pp. 746-769, 2008.
Joo et al., "Chemical Sensors with Integrated Electronics", Chemical Reviews, vol. 108, Issue No. 2, pp. 638-651, 2008.
Kauffman et al., "Carbon Nanotube Gas and Vapor Sensors", Angewandte Chemie International Edition, vol. 47, pp. 6550-6570, 2008.
Li et al., "Chemical Sensing Using Nanostructured Polythiophene Transistors", Nano Letters, vol. 8, Issue No. 11, pp. 3563-3567, 2008.

(56) References Cited

OTHER PUBLICATIONS

Palacios et al., "Rational Design of a Minimal Size Sensor Array for Metal Ion Detection", Journal of the American Chemical Society, vol. 130, Issue No. 31, pp. 10307-10314, 2008.
Hwili et al., "A Single Rod Multi-Modality Multi-Interface Level Sensor using an AC Current Source", IEEE International Workshop on Imaging Systems and Techniques, Sep. 10-12, 2008.
Guan et al., "Engine Lubricating Oil Classification by SAE Grade and Source Based on Dielectric Spectroscopy Data", Analytica Chimica Acta, vol. 628, Issue No. 1, pp. 117-120, Oct. 17, 2008.
Saltas et al., "Dielectric Properties of Non-Swelling Bentonite: The Effect of Temperature and Water Saturation", Journal of Non-Crystalline Solids, vol. 354, Issue No. 52-54, pp. 5533-5541, Dec. 15, 2008.
Ertl et al., "Interdigitated Impedance Sensors for Analysis of Biological Cells in Microfluidic Biochips", E & I Elektrotechnik und Informationstechnik, vol. 126, Issue No. 1, pp. 47-50, Feb. 2009.
US Non-Final Rejection issued in connection with corresponding U.S. Appl. No. 12/942,732 on Feb. 7, 2013.
De Souza et al., "A Close Dielectric Spectroscopic Analysis of Diesel/Biodiesel Blends and Potential Dielectric Approaches for Biodiesel Content Assessment", Fuel, vol. 105, pp. 705-710, Mar. 2013.
Swiech et al., "Dielectric Properties of Synthetic Oil Sands", Society of Petroleum Engineers—SPE Heavy Oil Conference Canada, vol. 1, pp. 238-248, 2013.
Zhu et al., "Survey of Lubrication Oil Condition Monitoring, Diagnostics, and Prognostics Techniques and Systems", Journal of Chemical Science and Technology, vol. 2, Issue No. 3, pp. 100-115, Jul. 2013.
US Final Rejection issued in connection with corresponding U.S. Appl. No. 12/325,653 on Aug. 8, 2013.
Unofficial English Translation of Japanese Office Action issued in connection with corresponding JP Application No. 2011-538590 on Oct. 8, 2013.
PCT Search Report and Written Opinion issued in connection with corresponding PCT Application No. PCT/SE2013/050671 on Nov. 18, 2013.
PCT Search Report and Written Opinion issued in connection with corresponding PCT Application No. PCT/US2013/058932 on Dec. 12, 2013.
PCT Search Report and Written Opinion issued in connection with corresponding PCT Application No. PCT/US2013/058898 on Dec. 18, 2013.
Unofficial English Translation of Chinese Office Action issued in connection with corresponding CN Application No. 201180031959.6 on Dec. 26, 2013.
US Non-Final Rejection issued in connection with corresponding U.S. Appl. No. 12/977,568 on Jan. 16, 2014.
PCT Search Report and Written Opinion issued in connection with corresponding PCT Application No. PCT/US2013/055983 on Jan. 27, 2014.
US Non-Final Rejection issued in connection with corresponding U.S. Appl. No. 12/827,623 on Jan. 30, 2014.
European Search Report and Opinion issued in connection with corresponding EP Application No. 11801238.4 on Mar. 5, 2014.
US Non-Final Rejection issued in connection with corresponding U.S. Appl. No. 12/325,653 on Mar. 17, 2014.
PCT Search Report and Written Opinion issued in connection with corresponding PCT Application No. PCT/SE2013/051590 on May 6, 2014.
PCT Search Report and Written Opinion issued in connection with corresponding PCT Application No. PCT/SE2013/051589 on May 6, 2014.
US Non-Final Rejection issued in connection with corresponding U.S. Appl. No. 13/630,939 on Aug. 11, 2014.
US Non-Final Rejection issued in connection with corresponding U.S. Appl. No. 14/031,965 on Aug. 26, 2014.
Soleimani et al., "Base Oil Oxidation Detection using Novel Chemical Sensors and Impedance Spectroscopy Measurements", Sensors and Actuators B: Chemical, vol. 199, pp. 247-258, Aug. 2014.
US Non-Final Rejection issued in connection with corresponding U.S. Appl. No. 14/031,951 on Sep. 2, 2014.
US Final Rejection issued in connection with corresponding U.S. Appl. No. 12/325,653 on Sep. 12, 2014.
Toledo et al., "Application of Quartz Tuning Forks and Extensional Microresonators for Viscosity and Density Measurements in Oil/Fuel Mixtures", Microsystem Technologies, vol. 20, Issue No. 4, pp. 945-953, 2014.
US Non-Final Rejection issued in connection with corresponding U.S. Appl. No. 13/484,674 on Nov. 3, 2014.
US Non-Final Rejection issued in connection with corresponding U.S. Appl. No. 13/558,499 on Dec. 4, 2014.
US Non-Final Rejection issued in connection with corresponding U.S. Appl. No. 13/630,954 on Dec. 15, 2014.
US Non-Final Rejection issued in connection with corresponding U.S. Appl. No. 13/729,800 on Dec. 19, 2014.
US Final Rejection issued in connection with corresponding U.S. Appl. No. 13/630,939 on Jan. 28, 2015.
US Non-Final Rejection issued in connection with corresponding U.S. Appl. No. 13/630,739 on Feb. 25, 2015.
Unofficial English Translation of Chinese Office Action issued in connection with corresponding CN Application No. 201180032850.4 on Mar. 2, 2015.
Unofficial English Translation of Japanese Office Action issued in connection with corresponding JP Application No. 2013518325 on Mar. 24, 2015.
Unofficial English Translation of Chinese Office Action issued in connection with corresponding CN Application No. 201110461799.0 on Mar. 30, 2015.
Zhu et al.,"An Integrated Lubricant Oil Conditioning Sensor Using Signal Multiplexing", Journal of Micromechanics and Micro engineering, vol. 25, Issue No. 25, pp. 1-12, 2015.
Unofficial English Translation of Japanese Office Action issued in connection with corresponding JP Application No. 2013-518328 on Apr. 7, 2015.
US Non-Final Rejection issued in connection with corresponding U.S. Appl. No. 13/729,851 on Apr. 28, 2015.
US Non-Final Rejection issued in connection with corresponding U.S. Appl. No. 13/630,587 on Jun. 2, 2015.
US Final Rejection issued in connection with corresponding U.S. Appl. No. 13/630,739 on Jun. 4, 2015.
US Non-Final Rejection issued in connection with corresponding U.S. Appl. No. 13/838,884 on Jun. 17, 2015.
PCT Search Report and Written Opinion issued in connection with corresponding PCT Application No. PCT/US2015/027482 on Jul. 15, 2015.
Unofficial English Translation of Japanese Notice of Allowance issued in connection with corresponding JP Application No. 2011-258627 on Aug. 4, 2015.
Taiwan Office Action issued in connection with corresponding TW Application No. 100146015 on Aug. 6, 2015.
US Non-Final Rejection issued in connection with corresponding U.S. Appl. No. 13/630,939 on Sep. 14, 2015.
Unofficial English Translation of Japanese Grant of Patent issued in connection with corresponding JP Application No. 2013518325 on Sep. 15, 2015.
US Non-Final Rejection issued in connection with corresponding U.S. Appl. No. 13/538,570 on Oct. 22, 2015.
European Search Report and Opinion issued in connection with corresponding EP Application No. 11801234.3 on Oct. 28, 2015.
Unofficial English Translation of Chinese Office Action issued in connection with corresponding CN Application No. 201380043615.6 on Nov. 9, 2015.
US Non-Final Rejection issued in connection with corresponding U.S. Appl. No. 12/824,436 on Dec. 2, 2015.
PCT Search Report and Written Opinion issued in connection with corresponding PCT Application No. PCT/EP2015/075026 dated Feb. 1, 2016.

(56) References Cited

OTHER PUBLICATIONS

Heeger, "Semiconducting and Metallic Polymers: The Fourth Generation of Polymeric Materials", The Journal of Physical Chemistry B, vol. 105, Issue No. 36, pp. 8475-8491, 2001.
Mourzina et al., "Development of Multisensor Systems based on Chalcogenide Thin Film Chemical Sensors for the Simulataneous Multicomponent Analysis of Metal Ions in Complex Solutions", Electrochimica Acta, vol. 47, Issue No. 1-2, pp. 251-258, Sep. 1, 2001.
Gawad et al., "Micromachined Impedance Spectroscopy Flow Cytometer for Cell Analysis and Particle Sizing", Lab on a Chip, vol. 1, Issue No. 1, pp. 76-82, Sep. 2001.
Akyildiz et al., "Wireless Sensor Networks: A survey", Computer Networks, vol. 38, pp. 393-422, 2002.
Harpster et al., "A Passive Humidity Monitoring System for In-Situ Remote Wireless Testing of Micropackages", Microelectromechanical System, vol. 11, Issue No. 1, pp. 61-67, 2002.
Haes et al., "A Nanoscale Optical Biosensor: Sensitivity and Selectivity of an Approach Based on the Localized Surface Plasmon Resonance Spectroscopy of Triangular Silver Nanoparticles", Journal of the American Chemical Society, vol. 124, Issue No. 35, pp. 10596-10604, 2002.
Janata et al., "Electrochemical Sensors and their Impedances: A Tutorial", Critical Reviews in Analytical Chemistry, vol. 32, Issue No. 2, pp. 109-120, 2002.
Ceresa et al., "Rational Design of Potentiometric Trace Level Ion Sensors. A Ag+-Selective Electrode with a 100 ppt Detection Limit", Analytical Chemistry, vol. 74, Issue No. 16, pp. 4027-4036, 2002.
Alary et al.,"Subsea Water Separation: A Cost-effective Solution for Ultra Deep Water Production", 17th World Petroleum Congress, Rio de Janeiro, Brazil, Sep. 1-5, 2002.
Butler et al., "Wireless, Passive, Resonant-Circuit, Inductively Coupled, Inductive Strain Sensor", Sensors and Actuators A: Physical, vol. 102, Issue No. 1, pp. 61-66, Dec. 1, 2002.
Johns et al., "Sensitive Indirect Photometric Detection of Inorganic and Small Organic Anions by Capillary Electrophoresis Using Orange G as a Probe Ion", Electrophoresis, vol. 24, Issue No. 3, pp. 557-566, Jan. 2003.
Fauveau et al., "Guided-Wave RADAR helps Level-Detection in Harsh Settings Control Engineering", Control Engineering, vol. 50, Issue 3, pp. 16, Mar. 2003.
Grate et al., "Sorptive Behavior of Monolayer-Protected Gold Nanoparticle Films: Implications for Chemical Vapor Sensing", Analytical Chemistry, vol. 75, Issue No. 8, pp. 1868-1879, Apr. 15, 2003.
Grimes et al., "Resonance Sensors: A Critical Review Sensors", Analytical Chemistry, vol. 75, Issue No. 8, pp. 1868-1879, Apr. 15, 2003.
De Borba et al., "Determination of Sodium at Low Ng/L Concentrations in Simulated Power Plant Waters by Ion Chromatography", Journal of Chromatography, vol. 995, Issue No. 1-2, pp. 143-152, May 2, 2003.
Sakharov et al., "Liquid Level Sensor using Ultrasonic Lamb Waves", Ultrasonics, vol. 41, Issue No. 4, pp. 319-322, Jun. 2003.
Kumar et al., "Investigation into the Interaction between Surface-Bound Alkylamines and Gold Nanoparticles", Langmuir, vol. 19, Issue No. 15, pp. 6277-6282, 2003.
Potyrailo et al., "Fluorescence Spectroscopy and Multivariate Spectral Descriptor Analysis for High-Throughput Multiparameter Optimization of Polymerization Conditions of Combinatorial 96-Microreactor Arrays", Journal of combinatorial Chemistry, vol. 5, Issue No. 1, pp. 8-17, 2003.
Mabic et al., "Quality Adjustment of Treated Water in an Experimental Detection", GIT Labor-Fachzeitschrift, vol. 47, pp. 724-727, 2003.
Pasquale, "Mechanical Sensors and Actuators", Sensors and Actuators, A: Physical, vol. 106, Issue No. 1-3, pp. 142-148, 2003.
Chopra et al., "Selective Gas Detection Using a Carbon Nanotube Sensor", Applied Physics Letters, vol. 83, pp. 2280-2282, 2003.
Janata et al., "Conducting Polymers in Electronic Chemical Sensors", Nature Materials, vol. 2, pp. 19-24, 2003.
Bauer et al., "Resonant Nanocluster Technology—From Optical Coding and High Quality Security Features to Biochips", Nanotechnology, vol. 14, Issue No. 12, pp. 1289-1311, Nov. 4, 2003.
Joseph et al., "Chemiresistor Coatings from Pt- and Au-Nanoparticle/Nonanedithiol Films: Sensitivity to Gases and Solvent Vapors", Sensors and Actuators B: Chemical, vol. 98, Issue No. 2-3, pp. 188-195, Mar. 15, 2004.
Shamsipur et al., "New Macrocyclic Diamides as Neutral Ionophores for Highly Selective and Sensitive PVC-Membrane Electrodes for Be2+ Ion", Electroanalysis, vol. 16, Issue No. 4, pp. 282-288, Mar. 2004.
Fransen, "New Control System Detects Desalter Problems before Upsets Occur", Agar Corporation, Prepared for presentation at The Aiche 2004 Spring National Meeting, Apr. 2004.
Bennett et al., "Monitoring the Operation of an Oil/Water Separator using Impedance Tomography", Minerals Engineering, vol. 17, Issue No. 5, pp. 605-614, May 2004.
Pavlov et al., "Aptamer-Functionalized Au Nanoparticles for the Amplified Optical Detection of Thrombin", Journal of The American Chemical Society, vol. 126, Issue No. 38, pp. 11768-11769, 2004.
Varma et al., "High-Speed Label-Free Detection by Spinning-Disk Micro-Interferometry", Biosensors and Bioelectronics, vol. 19, Issue No. 11, pp. 1371-1376, 2004.
Seyfried et al., "Measurement of Soil Water Content with a 50-MHz Soil Dielectric Sensor", Soil Science Society of America, vol. 68, Issue No. 2, pp. 394-403, 2004.
Want et al., "Enabling Ubiquitous Sensing with RFID", Computer, vol. 37, Issue No. 4, pp. 84-86, 2004.
Briglln et al., "Detection of Organic Mercaptan Vapors using Thin Films of Alkylamine-Passivated Gold Nanocrystals", Langmuir, vol. 20, Issue No. 2, pp. 299-305, 2004.
Ikenishi et al., "The Dielectric Characteristics of Agricultural Land for On-site and Real Time Measurement", SICE 2004 Annual Conference on, IEEE Xplore, vol. 2, pp. 1489-1492, Aug. 4-6, 2004.
Thomas et al., "Conjugated Polymer Sensors: Design Principles Towards Enhanced Versatility", Report No. A035334, 2 pages, Dec. 2004.
Rose et al., "Sensitivity Gains in Chemosensing by Lasing Action in Organic Polymers", Nature, vol. 434, pp. 876-879, Apr. 14, 2005.
Holstad et al., "Scattered Gamma Radiation Utilized for Level Measurements in Gravitational Separators", IEEE Sensors, vol. 5, Issue No. 2, pp. 175-182, Apr. 2005.
Cheung et al., "Impedance Spectroscopy Flow Cytometry: on-Chip Label-Free cell Differentiation", Cytometry A, vol. 65, Issue No. 2, pp. 124-132, Jun. 2005.
Jang et al., "Chemical Sensors Based on Highly Conductive Poly(3,4-Ethylene-Dioxythiophene) Nanorods", Advanced Materials, vol. 17. Issue No. 13, pp. 1616-1620, Jul. 2005.
Rakow et al., "Molecular Recognition and Discrimination of Amines with a Colorimetric Array", Angewandte Chemie, vol. 44, Issue No. 29, pp. 4528-4532, Jul. 18, 2005.
Zhang et al., "Colorimetric Sensor Array for Organics in Water", Journal of the American Chemical Society, vol. 127, Issue No. 33, pp. 11548-11549, 2005.
Jaworski et al., "Measurements of Oil-Water Separation Dynamics in Primary Separation Systems Using Distributed Capacitance Sensors", Flow Measurement and Instrumentation, vol. 16, Issue No. 2-3, pp. 113-127, 2005.
Buhrdorf et al., "Multiparameteric Oil Condition Sensor Based on the Tuning Fork Technology for Automotive Applications", Book chapter in Advanced Microsystems for Automotive Applications, pp. 289-298, 2005.
Burnell et al., "Synthesis and Electrooptical Properties of Copolymers Derived from Phenol-Functionalized Telechelic Oligofluorenes", Macromolecules, vol. 38, Issue No. 26, pp. 10667-10677, 2005.
Chuang et al., "Embeddable Wireless Strain Sensor Based on Resonant RF Cavities", Review of Scientific Instruments, vol. 20, pp. 1-7, Sep. 2005.

(56) References Cited

OTHER PUBLICATIONS

Bang et al., "A Novel Electrochemical Detection Method for Aptamer Biosensors", Biosensors and Bioelectronics, vol. 21, Issue No. 6, pp. 863-870, Dec. 15, 2005.
Locklin et al., "Effect of Morphology on Organic Thin Film Transistor Sensors", Analytical and Bioanalytical Chemistry, vol. 384, Issue No. 2, pp. 336-342, Jan. 2006.
Meng et al., "A Multi-Electrode Capacitance Probe for Phase Detection in Oil-Water Separation Processes: Design, Modelling and Validation", Measurement Science and Technology, vol. 17, Issue No. 4, pp. 881-894, Mar. 2006.
Casanella et al., "Oil-water Interface Level Sensor Based on an Electrode Array", Instrumentation and Measurement Technology Coference, Sorrento, Italy, pp. 710-713, Apr. 24-27, 2006.
Lange et al., "Measuring Biomolecular Binding Events with a Compact Disc Player Device", Angewandte Chemie International Edition, vol. 45, pp. 270-273, 2006.
Yang, "Sensors and Instrumentation for Monitoring and Control of Multi-Phase Separation", Measurement and Control, vol. 39, Issue No. 6, pp. 178-184, Jul. 2006.
Persaud et al., "Analysis of Discrimination Mechanisms in the Mammalian Olfactory System Using a Model Nose", Nature, vol. 299, pp. 352-355, Sep. 23, 1982.
Sen et al., "Frequency Dependent Dielectric and Conuctivity Response of Sedimentary Rocks", Journal of Microwave Power, vol. 18, Issue No. 1, pp. 95-105, 1983.
Raythatha et al., "Dielectric Properties of Clay Suspensions in MHz to GHz Range", Journal of Colloid and Interface Science, vol. 109, Issue No. 2, pp. 301-309, Feb. 1986.
Ward et al., "In Situ Interfacial Mass Detection with Piezoelectric Transducers", Science, vol. 249, Issue No. 4972, pp. 1000-1007, Aug. 31, 1990.
Shi et al., "Capacitance-Based Instrumentation for Multi-Interface Level Measurement", Measurement Science and Technology, vol. 2, Issue No. 10, pp. 923-933, 1991.
Wise et al., "Microfabrication Techniques for Integrated Sensors and Microsystem", Science, vol. 254, pp. 1335-1342, 1991.
Mullen et al., "Trace Detection of Ionic Species with Surface Enhanced Raman Spectroscopy", Spectroscopy, vol. 7, pp. 24-32, 1992.
Ervin et al., "Development of a Fiber-Optic Sensor for Trace Metal Detection in Aqueous Environments", Applied Optics, vol. 32, Issue No. 22, pp. 4287-4290, Aug. 1, 1993.
Agar et al., "Energy Absorption Probes Control Oily-Water Discharges", Hydrocarbon Processing, vol. 72, Issue No. 8, Aug. 1, 1993.
Wensink, "Dielectric Properties of Wet Soils in the Frequency Range 1-3000 MHz", Geophysical Prospecting, vol. 41, Issue No. 6, pp. 671-696, Aug. 1993.
Garrouch et al., "The Influence of Clay Content, Salinity, Stress, and Wettability on the Dielectric Properties of Brine-Saturated Rocks: 10 Hz to 10 MHz", Geophysics, vol. 59, Issue No. 6, pp. 909-917, Jun. 1994.
Pal, "Techniques for Measuring the Composition (Oil and Water Content) of Emulsions—Astate of the Art Review", Colloids and Surfaces: A Physicochemical and Engineering Aspects, vol. 84, Issue No. 2-3, pp. 141-193, 1994.
Isaksen et al., "A Capacitance-Based Tomography System for Interface Measurement in Separation Vessels", Measurement Science and Technology, vol. 5, Issue No. 10, pp. 1262-1271, Jun. 1994.
Yang et al., "A Multi-Interface Level Measurement System using a Segmented Capacitance Sensor for Oil Separators", Measurement Science and Technology, pp. 1177-1180, Jul. 19, 1994.
Amrani et al., "High-Frequency Measurements of Conducting Polymers: Development of a New Technique for Sensing Volatile Chemicals", http://iopscience.iop.org/0957-0233/6/10/010; 8 Pages, 1995.
Legin et al "Development and Analytical Evaluation of a Multisensor System for Water Quality Monitoring", Sensors and Actuators B: Chemical, vol. 27, Issue No. 1-3, pp. 377-379, Jun. 1995.
Nicolaou et al., "Radiofrequency Encoded Combinatorial Chemistry", Angewandte Chemie International Edition, vol. 34, pp. 2289-2291, 1995.
Garcia-Golding et al., "Sensor for Determining the Water Content of Oil-in-water Emulsion by Specific Admittance Measurement", Sensors and Actuators: A. Physical, vol. 47, Issue No. 1-3, pp. 337-341, 1995.
Hutzler et al., "Measurement of Foam Density Profiles Using AC Capacitance", Europhysics Letters, vol. 31, Issue No. 8, pp. 497-502, Sep. 10, 1995.
Di Natale et al., "Multicomponent Analysis of Heavy Metal Cations and Inorganic Anions in Liquids by a Non-Selective Chalcogenide Glass Sensor Array", Sensors and Actuators B: Chemical, vol. 34, Issue No. 1-3, pp. 539-542, Aug. 1996.
Malinowska et al., "Enhanced Electrochemical Performance of Solid-State Ion Sensors Based on Silicone Rubber Membranes", Sensors and Actuators B: Chemical, vol. 43, Issue No. 1-3, pp. 161-167, Jul. 1996.
Amrani et al., "Multi-frequency Measurements of Organic Conducting Polymers for Sensing of Gases and Vapours", Sensors and Actuators B: Chemical, vol. 33, Issue No. 1-3, pp. 137-141, Jul. 1996.
Leff et al., "Synthesis and Characterization of Hydrophobic, Organically-Soluble Gold Nanocrystals Functionalized with Primary Amines", Langmuir, vol. 12, Issue No. 20, pp. 4723-4730, 1996.
Chinowski et al., "Experimental Data from a Trace Metal Sensor Combining Surface Plasmon Resonance with Anodic Stripping Voltametry", Sensors and Actuators B: Chemical, vol. 35, Issue No. 1-3, pp. 37-43, Sep. 1996.
Josse et al., "AC-Impedance-Based Chemical Sensors for Organic Solvent Vapors", Sensors and Actuators B: Chemical, vol. 36, Issue No. 1-3, pp. 363-369, Oct. 1996.
Santamarina et al., "Dielectric Permittivity of Soils Mixed With Organic and Inorganic Fluids (0.02ghz to 1.30 GHz)", Journal of Environmental and Engineering Geophysics, vol. 2, Issue No. 1, pp. 37-52, 1997.
Hammond et al., "An Acoustic Automotive Engine Oil Quality Sensor", Solid State Sensors and Actuators, vol. 2, pp. 1343-1346, Jun. 1997.
Vlasov et al., "Cross-Sensitivity Evaluation of Chemical Sensors for Electronic Tongue: Determination of Heavy Metal Ions", Sensors and Actuators B: Chemical, vol. 44, Issue No. 1-3, pp. 532-537, Oct. 1997.
Di Natale et al., "Multicomponent Analysis on Polluted Waters by Means of an Electronic Tongue", Sensors and Actuators B: Chemical, vol. 44, Issue No. 1-3, pp. 423-428, Oct. 1997.
Ehret et al., "On-line Control of Cellular Adhesion with Impedance Measurements Using Interdigitated Electrode Structures", Medical & Biological Engineering & Computing, vol. 36, Issue No. 3, pp. 365-370, May 1998.
Wohltjen et al., "Colloidal Metal-Insulator-Metal Ensemble Chemiresistor", Anal.Chem, vol. 70, Issue No. 14, pp. 2856-2859, 1998.
Chyan et al., "Ultrapure Water Quality Monitoring by a Silicon-Based Potentiometric Sensor" Analyst, vol. 125, Issue No. 1, pp. 175-178, 1999.
Homola et al., "Surface Plasmon Resonance Sensors: Review", Sensors and Actuators B: Chemical, vol. 54, Issue No. 1-2, pp. 3-15, Jan. 25, 1999.
Jaworski et al., "A Capacitance Probe for Interface Detection in Oil and Gas Extraction Plant", Measurement of Science and Technology, vol. 10, Issue No. 3, pp. L15-L20, Jan. 1999.
Amrani et al., "Multi-Frequency Interrogation Technique Applied to Conducting Polymer Gas and Odour Sensors", vol. 146, pp. 95-101, Mar. 1999.
Schuller et al., "Advanced Profile Gauge for Multiphase Systems", 1st World Congress on Industrial Process Tomography, Buxton, Greater Manchester, Apr. 14-17, 1999.
Asskildit et al., "New Measuring Sensor for Level Detection in Subsea Separators", ABB Review, pp. 11-17, Apr. 1999.

(56) References Cited

OTHER PUBLICATIONS

Ishida et al., "Effects of pH on Dielectric Relaxation of Montmorillonite, Allophane, and Imogolite Suspensions, Colloid and Interface Science", ScienceDirect, vol. 212, Issue No. 1, pp. 152-161, Apr. 1999.
Legin et al., "The Features of the Electronic Tongue in Comparison with the Characterstics of the Discrete Ion Selective Sensor", Sensors and Actuators B: Chemical, vol. 58, Issue No. 1-3, pp. 464-468, Sep. 21, 1999.
Artmann, "Electronic Identification Systems: State of the Art and their Further Development", Computers and Electronics in Agriculture, vol. 24, Issue No. 1-2, pp. 5-26, Nov. 1999.
Jurs et al., "Computational Methods for the Analysis of Chemical Sensor Array Data from Volatile Analytes", Chemical Reviews, vol. 100, Issue No. 7, pp. 2649-2678, 2000.
McQuade et al., "Conjugated Polymer-Based Chemical Sensors", Chem. Rev, vol. 100, Issue No. 7, pp. 2537-2574, 2000.
Vlasov et al., "Electronic Tongue—New Analytical Tool for Liquid Analysis on the basis of Non-Specific Sensors and Methods of Pattern Recognition", Sensors and Actuators B: Chemical, vol. 65, Issue No. 1-3, pp. 235-236, Jun. 30, 2000.
Rakow et al., "A Colorimetric Sensor Array for Odour Visualization", Nature, vol. 406, pp. 710-713, Aug. 17, 2000.
Taton et al., "Scanometric DNA Array Detection with Nanoparticle Probes", Science, vol. 289, Issue No. 5485, pp. 1757-1760, Sep. 8, 2000.
Shirakawa, "The Discovery of Polyacetylene Film: The Dawning of an Era of Conducting Polymers", Angewandte Chemie International Edition, vol. 40, Issue No. 14, pp. 2574-2580, Jul. 16, 2001.
Ong et al., "Design and Application of a Wireless, Passive, Resonant-Circuit Environmental Monitoring Sensor", Sensors and Actuators A: Physical, vol. 93, Issue No. 1, pp. 33-43, Aug. 25, 2001.
Kaya, "A Electrical Spectroscopy of Kaolin and Bentonite Slurries", Turkish Journal of Engineering and Environmental Sciences, vol. 25, pp. 345-354, 2001.
Lee, "Increase Oil Production and Reduce Chemical Usage through Separator Level Measurement by Density Profiling", ISA TECH/EXPO Technology Update Conference Proceedings, vol. 416, pp. 321-328, 2001.
MacDiarmid, "Synthetic Metals: A Novel Role for Organic Polymers", Angewandte Chemie International Edition, vol. 40, pp. 2581-2590, 2001.

* cited by examiner

DISPOSABLE MULTIVARIABLE SENSING DEVICES HAVING RADIO FREQUENCY BASED SENSORS

BACKGROUND

The invention relates to sensing devices, and more particularly to multivariable sensing devices.

Radio frequency identification (RFID) tags are widely employed for automatic identification of objects (e.g. animals, garments, etc.) and monitoring and detection of containers (such as, unauthorized access to contents of containers). Generally, RFID readers are used to obtain digital data from the RFID tags for such automatic identification. Digital data may include, for example, digital identification of the tag, or any other information written and/or stored in a memory chip of the RFID tags. The RFID tags transmit electromagnetic signals at different relative levels of transmitted power at different times. Signals received by the RFID reader in combination with the transmitted relative power levels of the received signals from the RFID tags are employed to locate the RFID tags, and read the digital identification information from the RFID tags (e.g., from a memory chip or a back-reflector structure of a RFID tag).

Further, radio frequency based sensors are used for sensing physical, chemical and biological constituents in a sample. Moreover, the radio frequency based sensors are cost-effective, and easy to incorporate in a component or a system for measuring physical, chemical or biological constituents of the component or the system. Typically, analog or sensor data from the radio frequency based sensors is read using an impedance reader. Further, the sensor data is read with the help of a pick-up coil that is integral part of the radio frequency based sensor.

BRIEF DESCRIPTION

In accordance with aspects of the present specification, a multivariable sensing device for sensing one or more parameters of a process fluid disposed in a container is provided. The multivariable sensing device includes a radio frequency based sensor configured to sense a physical parameter, a chemical parameter, a biological parameter, or combinations thereof, representative of the process fluid. The radio frequency based sensor includes a sensor substrate, a radio frequency coil disposed on at least a portion of the sensor substrate, and a support structure configured to be physically coupled to the container. Further, the support structure is configured to position the radio frequency based sensor in operative proximity to an inside of the container.

In accordance with another aspect of the present specification, a multivariable sensing system having a multivariable sensing device, a sensor reader, and a pick-up coil is provided. The multivariable sensing device is configured for sensing one or more parameters of a process fluid disposed in a container. The multivariable sensing device includes a radio frequency based sensor configured to sense a physical parameter, a chemical parameter, a biological parameter, or combinations thereof, representative of the process fluid. Further, the radio frequency based sensor includes a sensor substrate, a radio frequency coil disposed on at least a portion of the sensor substrate, and a support structure configured to be physically coupled to the container. Moreover, the support structure is configured to position the radio frequency based sensor in operative proximity to an inside of the container. The sensor reader is configured to transmit interrogating radio frequency signals to the radio frequency based sensor and receive response signals from the radio frequency based sensor. Further, the pick-up coil is operatively coupled to the radio frequency based sensor and the sensor reader. Also, the pick-up coil is configured to receive the response signals from the radio frequency based sensor and transmit the response signals to the sensor reader.

In accordance with yet another aspect of the present specification, a method of multivariable sensing for a process fluid disposed in a container is provided. The method includes operatively coupling a radio frequency based sensor to a support structure to form a multivariable sensing device. Further, the radio frequency based sensor includes a sensor substrate and a radio frequency coil disposed on at least a portion of the sensor substrate. The method also includes operatively coupling the multivariable sensing device to the container, providing a sensor reader operatively coupled to the radio frequency based sensor, and providing a pick-up coil disposed outside the support structure, and operatively coupling a pick-up coil to the radio frequency based sensor. Moreover, the method includes sensing one or more parameters from the container, transmitting data pertaining to the one or more measurements to the sensor reader using the pick-up coil, and determining one or more parameters associated with the process fluid disposed in the container.

DRAWINGS

These and other features, aspects, and advantages of the present invention will become better understood when the following detailed description is read with reference to the accompanying drawings in which like characters represent like parts throughout the drawings, wherein.

Figure 6:
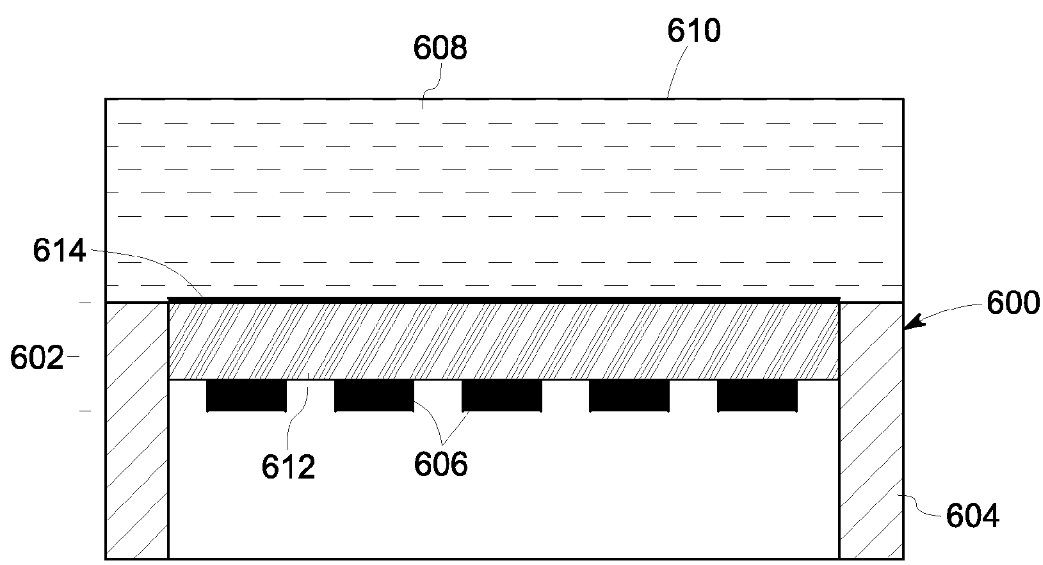
Figure 7:
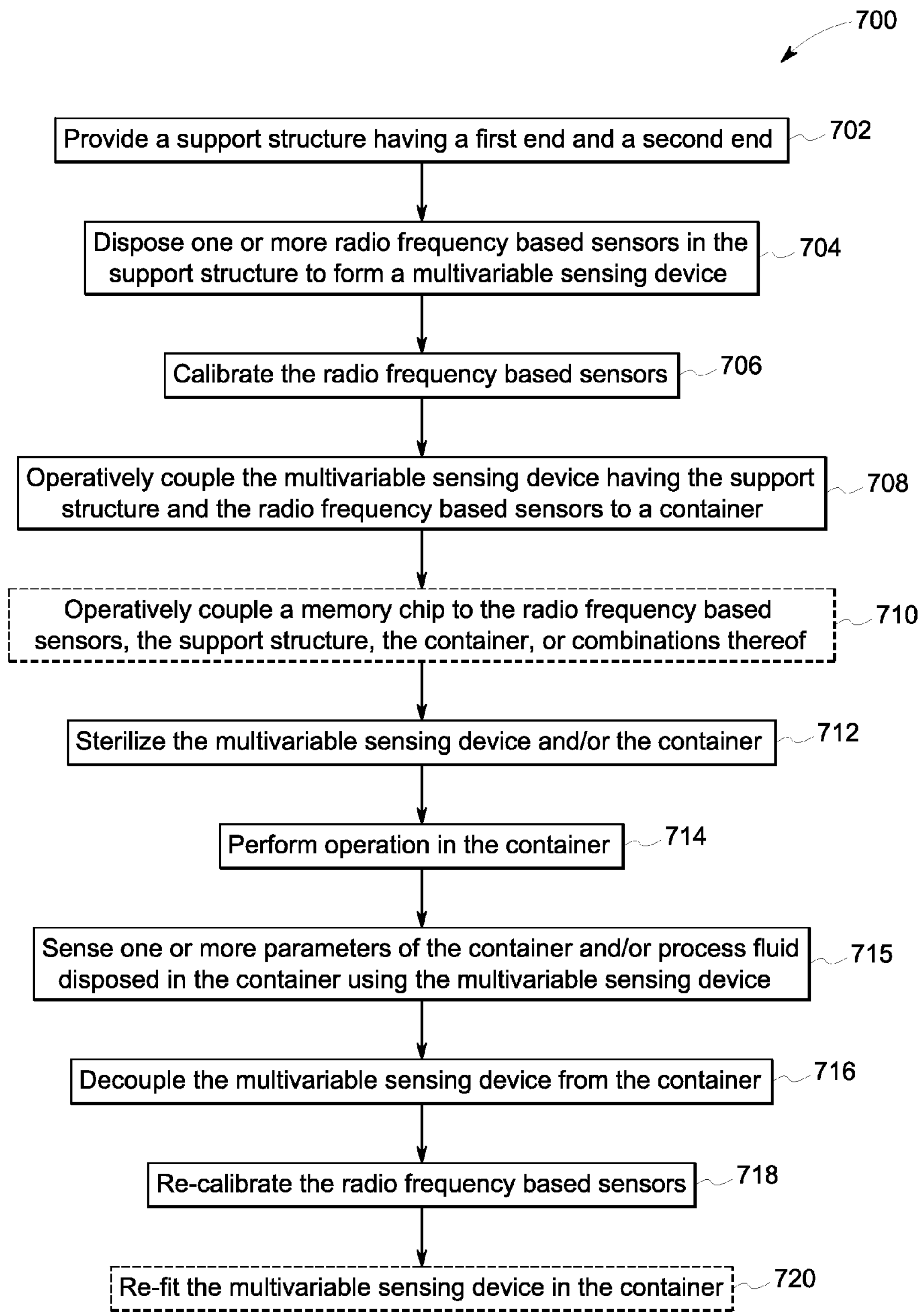
Figure 8:
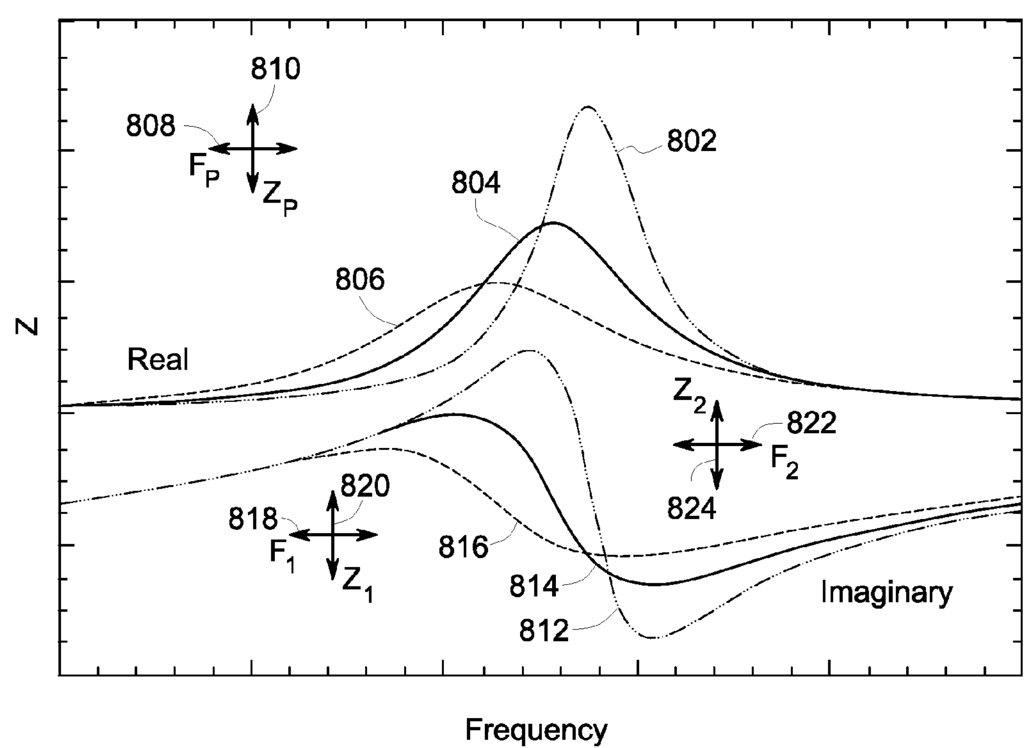
Figure 11:
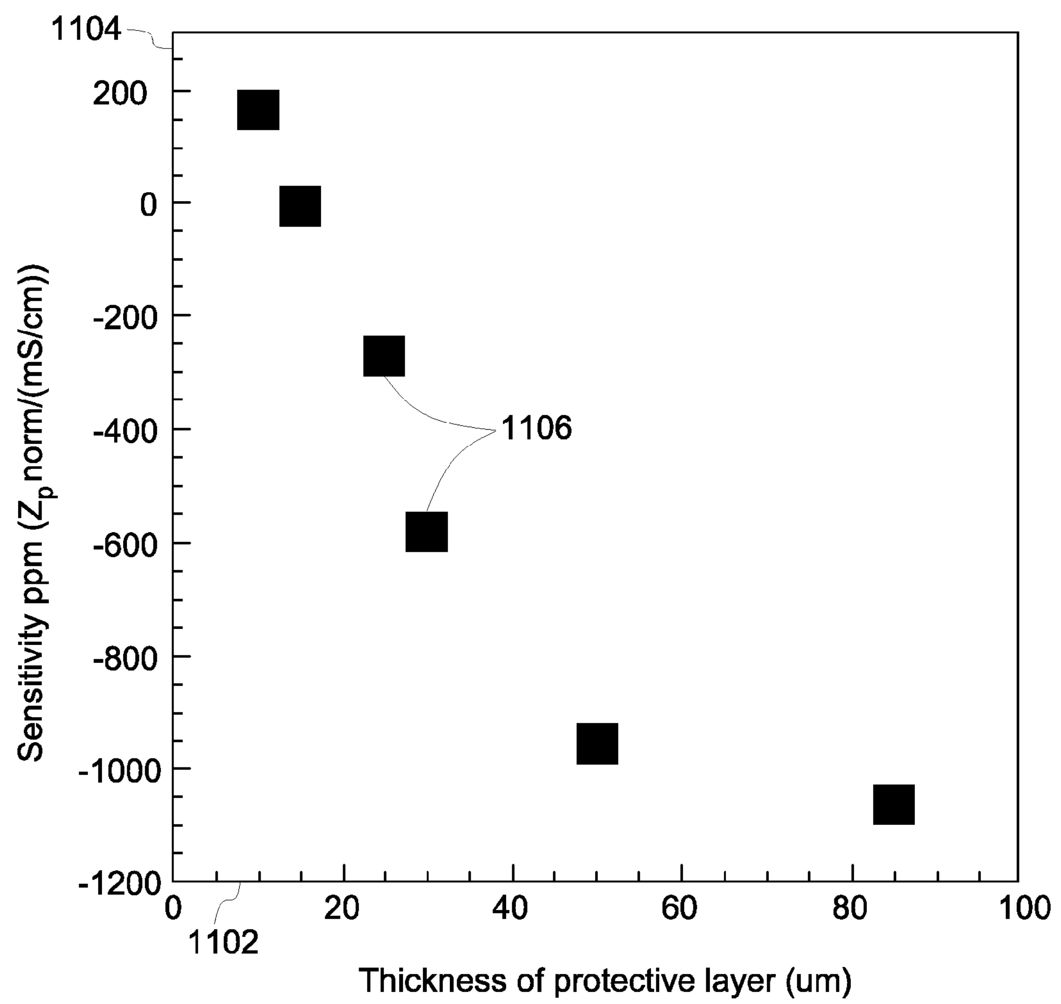

FIG. 6 is a schematic representation of an exemplary multivariable sensing device operatively coupled to a container having a process fluid, where the multivariable sensing device includes a radio frequency based sensor having a sensing coil and a sensor substrate, and where the sensor substrate is configured to be in physical contact with the process fluid disposed in the container, in accordance with aspects of the present specification;

FIG. 7 is an exemplary flow chart of a method of use of a multivariable sensing device, in accordance with aspects of the present specification;

FIG. 8 is a graphical representation of examples of real and imaginary portions of a measured analog response of the radio frequency based sensor, in accordance with aspects of the present specification;

FIG.S. 9-10 are graphical representations of measurements of electrical conductivity of aqueous solutions over a broad dynamic range using individual radio frequency based resonance sensors having protection layers of different thickness values, in accordance with aspects of the present specification;

FIG. 11 is a graphical representation of a sensitivity of a radio frequency based sensor as a function of different thickness values of protection layers, in accordance with aspects of the present specification; and FIG.S. 12-13 are graphical representations of measurements of electrical conductivity of aqueous solutions over a broad dynamic range using individual radio frequency based sensors having different thickness values of sensor substrates of the individual radio frequency based sensors, in accordance with aspects of the present specification.

DETAILED DESCRIPTION

Embodiments of the present specification relate to disposable multivariable sensing devices employing one or more radio frequency based sensors. In certain embodiments, the one or more radio frequency based sensors of the multivariable sensing devices may be used to sense one or more parameters inside a container, such as a container used in a bioprocess. Further, the radio frequency based sensors may be configured to measure a plurality of parameters inside the container, thereby attributing the multivariable nature to the multivariable sensing devices by enabling the radio frequency based sensors to sense more than one parameter. Non-limiting examples of such parameters may include electrical conductivity, pH level, temperature, blood relevant measurement, ionic measurement, non-ionic measurement, non-conductivity measurement, electromagnetic radiation level measurement, pressure, vapor concentration, biological material concentration, multiphase composition, or combinations thereof. Moreover, in one embodiment, the disposable multivariable sensing devices may be employed for monitoring and control of in-line manufacturing.

In some embodiments, the disposable multivariable sensing device may be at least partly disposable in nature. In some other embodiments, the disposable multivariable sensing device may include one or more components that may be single use components. In particular, the one or more single use components may not be usable after being used once. Further, some or all of the components of the multivariable sensing device may be disposable in nature. As used herein, the terms "single use component" refers to a component that, after operation, may be reconditioned for reuse. As used herein, the term "disposable component" refers to a component that may be disposed off after use. It may be noted that the terms "multivariable sensing device" and "disposable multivariable sensing device" may be used interchangeably throughout the application.

In certain embodiments, a multivariable sensing device of the present specification includes a radio frequency based sensor that is configured to sense a physical parameter, a chemical parameter, a biological parameter, or combinations thereof of a process fluid disposed in a container. The radio frequency based sensor includes a sensor substrate and a radio frequency coil disposed on at least a portion of the sensor substrate. Further, the radio frequency based sensor may be disposed in a support structure that is configured to be physically coupled to the container. Moreover, the support structure is configured to position the sensor in operative proximity to the inside of the container to enable the radio frequency based sensor to sense one or more parameters of the contents disposed in the container. The multivariable sensing device may further include a memory chip operatively coupled to at least one of the radio frequency based sensor and the container.

In certain embodiments, radio frequency based sensor of the multivariable sensing device may be configured to sense one or more parameters of the process fluid disposed in the container, e.g., one or more parameters of a fluid disposed in the container. To sense the one or more parameters, the radio frequency based sensor may be configured to receive interrogation signals from a sensor reader. Further, the radio frequency based sensor is configured to transmit response signals to the sensor reader. The signals may be received and/or transmitted by the radio frequency based sensor using a wired communication or a wireless communication with the sensor reader. Further, the interrogation signals may be configured to activate the radio frequency based sensor to send the one or more parameters of the container or the constituents disposed in the container.

Non-limiting examples of sensor parameters that are measured using an analog portion of the response signals may include impedance spectrum, a real part of the impedance spectrum, an imaginary part of the impedance spectrum, both real and imaginary parts of the impedance spectrum, a frequency of the maximum of the real part of the impedance (Fp), a magnitude of the real part of the impedance (Zp), a resonant frequency ($F_1$) and its magnitude ($Z_1$) of the imaginary part of the impedance, anti-resonant frequency ($F_2$) and its magnitude ($Z_2$) of the imaginary part of the impedance, or combinations thereof. Further, other parameters of the analog signal that may also be measured may include a quality factor, a zero crossing resonance frequency, and the like. In one embodiment, individual parameters (for example, Fp, Zp) may be utilized for quantitative measurements. Further, combinations of the individual measured parameters may be processed using well known multivariate techniques, for example principal components analysis, partial least squares, support vector machine, and many others.

In one example, a radio frequency based sensor of the disposable multivariable sensing device may be disposable. In this example, after operation, the radio frequency based sensor may be removed from the remaining reusable portion of the multivariable sensing device. Further, the radio frequency based sensor may be replaced by another radio frequency based sensor. In another example where the whole structure of the multivariable sensing device is disposable, the entire multivariable sensing device may be replaced by another multivariable sensing device to prepare the container for next operation.

Further, in some embodiments, the container may be configured to house a solution, also referred to as a "process fluid" or a "bio-processing fluid." The solution may be disposed in the container for storing, processing, transferring, or combinations thereof. Further, the solution in the container may be liquid, gas, solid, or a combination of liquid and solid. For example, the solution may be blood, water, electrically conductive fluid, electrically non-conductive fluid, oil, fuel, a biological buffer, or combinations thereof. Alternatively, the solution may contain a toxic industrial material, a chemical warfare agent, a gas, a vapor, an explosive, a disease marker in exhaled breath, a biopathogen in water, a virus, bacteria, and other pathogens. In certain embodiments, the container may be disposable or reusable. In some of these embodiments, the container may be a disposable bioprocess component and the multivariable sensing device may be configured to sense one or more parameters of the solution disposed in the disposable process component before, during or after operation in the disposable bioprocess component, e.g., during biopharmaceutical manufacturing.

In embodiments where the container is a disposable container, the multivariable sensing device may be permanently fixed to the container. Whereas, in embodiments where the container is a reusable container, the multivariable sensing device may be removably coupled to the container, such that the multivariable sensing device may be coupled and decoupled a number of times from the container as desirable. In certain embodiments, the disposable process component may be a filter, a connector, a valve, or the like. Further, the container may be a vessel used in a bioprocess, a chemical process, a chemical reaction, a biological interaction, or the like. Moreover, the container may be a storage container, a process container, or a flow container. Also, the container may have a steady state fluid. Alternatively, the container may be configured to receive a flowing fluid from one port and provide an outlet to the flowing fluid from another port with or without interrupting the flow of the fluid. It may be noted that in some embodiments, the radio frequency based sensor may be disposed in the support structure such that the radio frequency based sensor forms a hermetic sealing with portions of the support structure that are adjacently disposed to the radio frequency based sensor. The hermetic sealing may be configured to prevent any process fluid from the container from leaking into the multivariable sensing device. Further, it may be noted that the multivariable sensing device may be sterilized prior to being coupled to the container.

In one embodiment, the radio frequency based sensor may be disposed in the support structure such that the sensor substrate of the radio frequency based sensor is disposed towards a side of the support structure that is in physical contact with the container. In this embodiment, the sensor substrate of the radio frequency based sensor may be exposed to the process fluid disposed in the container. In a particular embodiment, the radio frequency based sensor may be disposed in the support structure such that the contents in the container may be in direct physical contact with the sensor substrate. Further, thickness values of the sensor substrate may be varied depending on desirable value of sensitivity in sensed parameters, while managing physical integrity of the multivariable sensing device. In one example, a thickness of the sensor substrate may be in a range from about 100 nanometers to about 10 centimeters. In some of these embodiments, the sensor substrate may be made of a dielectric material.

Alternatively, in another embodiment, the radio frequency based sensor may be disposed in the support structure such that the radio frequency coil is disposed towards a side of the support structure that is in physical contact with the container. In this embodiment, the radio frequency coil may be exposed to the process fluid disposed in the container. Further, in this embodiment, a protection layer may be disposed on the radio frequency coil to prevent direct interaction between the radio frequency coil and the process fluid.

It may be noted that the orientation of the radio frequency based sensor in the support structure may be decided based on the type of parameters that need to be measured. In a non-limiting example, an electrical conductivity or temperature of a liquid sample disposed in the container may be measured by disposing the support structure in the container such that the radio frequency coil is directed towards the side of the support structure that is physically coupled to the sensor. In another example, a pressure of the process fluid may be measured by bringing the sensor substrate in direct physical contact with the process fluid.

Further, typically, in addition to the sensor coil or the radio frequency coil, a pick-up coil is coupled to the radio frequency based sensor to communicate with a sensor reader. In embodiments of the present specification, the pick-up coil does not form part of the radio frequency based sensor. In particular, in certain embodiments, the pick-up coil may be an entity that is independent of the multivariable sensing device. Further, in certain other embodiments, the pick-up coil may be an entity that is independent of the sensor reader. Alternatively, the pick-up coil may be a part of the sensor reader. Advantageously, absence of the pick-up coil from the structure of the radio frequency based sensor results in simplification of the design of the multivariable sensing device. Further, absence of the pick-up coil from the structure of the multivariable sensing device reduces the cost of the multivariable sensing device. Moreover, when the pick-up coil is used as a separate entity from the radio frequency based sensor or as a part of the sensor reader, a single pick-up coil may be used to acquire signals from one or even more than one radio frequency based sensors of one or more multivariable sensing devices. Accordingly, a single pick-up coil may be associated with one or more radio frequency based sensors and/or multivariable sensing devices, thereby reducing the overall cost of the system. Moreover, in absence of physical presence of the pick-up coil from the radio frequency based sensor, capacitance and inductance otherwise associated with the pick-up coil do not affect the radio frequency based sensor. It may be noted that the inclusion of the pick-up coil requires an additional set of calibration parameters such as pick-up coil resistance, pick-up coil capacitance, pick-up coil inductance, and others such as temperature effects on pick-up coil metallic and dielectric components. Further, exposing of the sensor and the pick-up coil to the environments of interest such as temperature, pressure, and others needed in bioprocess applications, adds a complexity in such calibrations. Advantageously, absence of the pick-up coil from the radio frequency based sensor simplifies the sensor design, and also eliminates the need for calibration of the radio frequency based sensor to account for the pick-up coil. Further, in embodiments where the pick-up coil is an individual independent entity, the pick-up coil may be wirelessly coupled to the radio frequency based sensor. Additionally, the pick-up coil may be coupled to the sensor reader in a wireless or wired manner. In embodiments where the pick-up coil is a part of the sensor reader, the pick-up coil may be disposed in the housing of the sensor reader.

In certain embodiments, a multivariable sensing assembly includes a multivariable sensing device and a pick-up coil. Further, the multivariable sensing assembly may be formed by disposing the multivariable sensing device and the pick-up coil in a determined relative physical configuration. It may be noted that the determined relative physical configuration may include a constant physical distance between the multivariable sensing device and the pick-up coil. In some embodiments, the pick-up coil may be disposed at a determined distance from the multivariable sensing device to be in operative association with the multivariable sensing device. Further, in some of these embodiments, the pick-up coil may be physically coupled to the sensor reader using an electrical cable. Whereas, in some other embodiments, the pick-up coil may be wirelessly coupled to the sensor reader. In these embodiments, the wireless coupling between the pick-up coil and the sensor reader may be provided by inductive coupling, capacitive coupling, or the like.

Further, in some embodiments, the sensor reader may be wired to the multivariable sensing device, in these instances, the wired communication between the sensor reader and the radio frequency based sensor may be performed by connecting the radio frequency based sensor to the sensor reader by an electrical cable. Alternatively, the wired communication between the sensor reader and the radio frequency based sensor may be performed by a direct electrical connection to the radio frequency based sensor without the need for an electrical cable. It may be noted that such direct connection may be achieved when the size of the sensor reader is approximately the size of the sensor. In some other embodiments, the sensor reader may be in wireless communication with the sensor reader. In these embodiments, the pick-up coil may be coupled to the sensor reader and the radio frequency based sensor in a wired or wireless fashion.

In certain embodiments, the sensor reader may include a network analyzer or an impedance analyzer to read analog portion of the response signals and a reader/writer to read digital portion of the response signals from the radio frequency based sensor. It may be noted that the analog and digital portions of the response signals from the radio frequency based sensor may be read in several ways. In one embodiment, the analog and digital portions of the response signals may be read in a sequential manner during installation and operation of a corresponding container, such as, but to limited to a disposable bioprocess component, with a radio frequency based sensor of a disposable multivariable sensing device, also referred to as "an integrated radio frequency based sensor". Further, in another embodiment, the digital portion of the response signals of the radio frequency based sensor may be read before and/or during installation of the disposable bioprocess component with an integrated radio frequency based sensor and the analog portion of the response signals of the radio frequency based sensor may be read during the operation of the disposable bioprocess component. Further, in one embodiment, an operational frequency range of the analog portion of the response signals of the integrated radio frequency based sensor during the operation of the disposable bioprocess component may be within a frequency range that is desirable for reading the memory chip using the radio frequency based sensor. However, if in this embodiment, the operational frequency range of the analog portion of the response signals during the operation of the disposable bioprocess component falls outside the frequency range of reading the memory chip using the radio frequency based sensor, the memory chip may be unreadable during operations in the disposable bioprocess component.

In yet another embodiment, the digital portion of the response signals may be read before and during the installation of the disposable bioprocess component and after the operation of the disposable bioprocess component with a radio frequency based sensor of a disposable multivariable sensing device operatively coupled to the disposable bioprocess component. Further, the analog portion of the response signals may be read during the operation of the disposable bioprocess component using the integrated radio frequency based sensor. In another embodiment, the digital portion of the response signals may be read before and during the installation of the disposable bioprocess component with the multivariable sensing device and after the operation of the disposable bioprocess component with the integrated radio frequency based sensor of the multivariable sensing device. Further, in this embodiment, the analog portion of the response signals may be read during the operation of the disposable bioprocess component with the integrated radio frequency based sensor.

In certain embodiments, a radio frequency based sensor of a multivariable sensing device may have at least two resonances. Further, one resonance of the at least two resonances may be used to read the digital portion of the sensor response signals with the ability to read/write information from/into the memory chip. While, another resonance of the at least two resonances of the sensor may be used to read the analog portion of the sensor response signals with the ability to quantitatively measure environmental parameters of the process fluid.

In one embodiment, the radio frequency based sensor may be calibrated before disposing the radio frequency based sensor in the support structure. In particular, the radio frequency based sensor may be calibrated before operation in the container commences. Further, the radio frequency based sensor may be re-calibrated after the operation in the container is completed. In particular, the radio frequency based sensor may be removed from the support structure after the operation, re-calibrated and then re-installed in the support structure. Accordingly, depending on the application, the radio frequency based sensor and the support structure may be permanently attached or removably attached to the support structure such that the radio frequency based sensor may be de-attached and attached several number of times from the support structure. For example, in applications requiring re-calibration of the radio frequency based sensor post operation, the radio frequency based sensor may be removably attached to the support structure. Whereas, in single use applications, the radio frequency based sensor may be permanently fixed to the support structure. Further, in single use applications, the multivariable sensing device may be permanently fixed to the container. In embodiments where the sensor is removably attached to the container, it is possible to remove the radio frequency based sensor from the support structure, or remove and subsequently re-fix the radio frequency based sensor in the support structure, after use, calibration and/or validation. For example, post operation, the radio frequency based sensor may be removed from the support structure for calibration and then disposed back in the support structure for further operation in the container.

Figure 1:
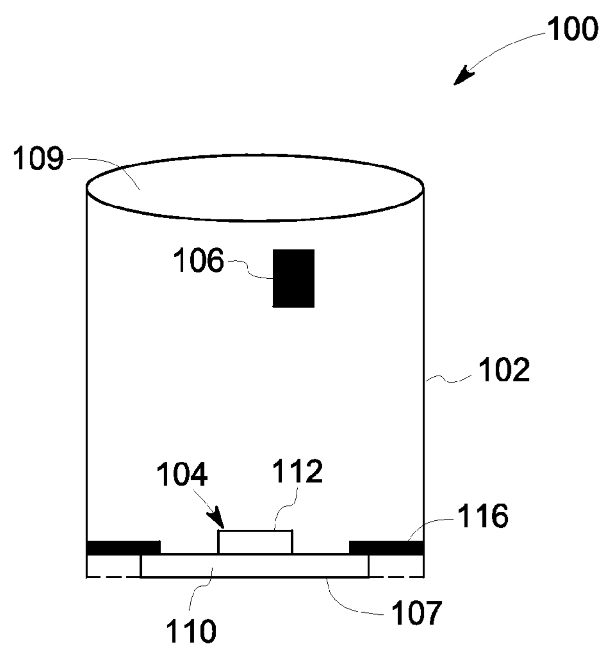
FIG. 1 is a cross-sectional view of a multivariable sensing device having a radio frequency based sensor disposed in a support structure, in accordance with aspects of the present specification.

FIG. 1 illustrates an exemplary embodiment of the multivariable sensing device 100 of the present specification. Further, the multivariable sensing device 100 includes a support structure 102, a radio frequency based sensor 104 and a memory chip 106. The support structure 102 has a first end 107 and a second end 109. Further, the radio frequency based sensor 104 includes a sensor substrate 110 and a radio frequency coil 112. In the illustrated embodiment, the first end 107 of the support structure 102 is configured to receive the radio frequency based sensor 104.

Further, the first end 107 or the second end 109 of the support structure 102 may be configured to be coupled to a container (not shown in FIG. 1), such as a bioprocess component, for measuring one or more parameters of a process fluid present in the container. Consequently, in the presently contemplated configuration, if the first end 107 of the support structure 102 is coupled to the container, at least a portion of the sensor substrate 110 of the radio frequency based sensor 104 may be disposed in close proximity to the container and thus the process fluid. Whereas, if the second end 109 of the support structure 102 is coupled to the container, the radio frequency coil 112 of the radio frequency based sensor 104 may be disposed in close proximity to the process fluid present in the container. In this embodiment, a protection layer (not shown in FIG. 1) may be disposed on at least a portion of the radio frequency based sensor 104, such that the protection layer is disposed between the process fluid and the radio frequency coil 112 to protect the radio frequency coil 112 from being adversely affected by physical contact with the process fluid. By way of example, in instances where the process fluid is an electrically conductive liquid, the presence of the protection layer on the radio frequency coil may prevent portions of the radio frequency coil 112 from being electrically shorted due to presence of the process fluid. For example, the protection layer may be employed for applications such as, but not limited to, pH sensing, glucose sensing, carbon dioxide sensing, oxygen sensing, pressure sensing, temperature sensing, and gamma radiation sensing. However, in embodiments where the radio frequency based sensor 104 is disposed such that the sensor substrate 110 and not the radio frequency coil 112 is in direct physical contact with the contents in the container, it may not be required to employ the protection layer on the radio frequency based sensor 104. In some embodiments, the protection layer may include materials, such as, but not limited to, $SiO_2$, $Si_3N_4$, SiC, $Al_2O_3$, parylene, parylene D, parylene N, parylene C, or combinations thereof.

In certain embodiments, the radio frequency based sensor 104 is configured to sense one or more conditions including a physical condition, a biological condition or a chemical condition. The multivariable sensing device 100 is configured to provide a quantitative response for a desirable parameter inside a container. For example, the multivariable sensing device 100 may be employed to monitor magnitude of an environmental parameter of interest such as, but not limited to, conductivity measurement, pH level, temperature, blood relevant measurement, ionic measurement, non-ionic measurement, non-conductivity measurement, electromagnetic radiation level measurement, pressure, vapor concentration, biological material concentration, and other types of measurements that may be taken from a typical fluid (solution or gas). In one example, the multivariable sensing device 100 may be used in conjunction with disposable bioprocess components to monitor the parameters inside the components during or after the operation.

In certain embodiments, the support structure 102 may include a circular cross-section or any other geometrical or non-geometrical shaped cross-section. Further, the support structure 102 may or may not be a closed structure. By way of example, the support structure 102 may be in the form of a sleeve, casing, sheath, or any other form that is configured to receive the radio frequency based sensor 104 and retain the radio frequency based sensor 104 in its position at least during operation of the container. Further, the support structure 102 may be configured to receive the radio frequency based sensor 104 from the first end 107 or from the second end 109.

Further, in certain embodiments, the support structure 102 may be removably or temporarily coupled to the container. One example of removable coupling the support structure 102 may entail simply sliding a portion of the support structure 102 in a corresponding provision in the container. In these embodiments, the support structure 102 may be removed from the container, when desirable. In one example, the support structure 102 may be decoupled from the container, for example, after completion of the process in the container. Further, the support structure 102 may be re-inserted for another process to the same or a different container. Optionally, in case of a re-use of the multivariable sensing device 100, the multivariable sensing device 100 may be sterilized prior to re-inserting the support structure 102 to the same or different container. Further, to prevent contamination and/or undesirable carryover of the sample from one process to another, the radio frequency based sensor 104 may be replaced by another radio frequency based sensor at the end of the process, or whenever the support structure 102 is de-coupled from the container. In some other embodiments, the support structure 102 may be permanently fixed to the container using techniques, such as, but not limited to, ultrasonic welding, dielectric welding (also known as high frequency (HF) welding or radio frequency (RF) welding), laser welding, hot plate welding, hot knife welding, induction/impulse, insert molding, in-mold decoration and the other standard types of material welding and joining methods.

In some embodiments, the radio frequency based sensor 104 may be coupled to a portion of the support structure 102 using chemical ways, mechanical ways, or both. By way of example, the radio frequency based sensor 104 may be retained or coupled to the support structure 104 using mechanical retainers 116 such as, but not limited to, clamps, rings, latch, fastener, pins, or combinations thereof. Alternatively, the radio frequency based sensor 104 may be retained or coupled using adhesives, such as, but not limited to, epoxy based adhesives.

In some embodiments, the radio frequency based sensor 104 may be disposable in nature. In one embodiment, the radio frequency based sensor 104 may be a radio frequency identification (RFID) tag. Further, the RFID tag may be disposable in nature. In certain embodiments, the radio frequency based sensor 104 is configured to operate based on codes of radio frequency signal generation. Further, the radio frequency based sensor 104 may be configured to resonate at a radio frequency in a range from about 0.01 MHz to about 3000 MHz. Further, the radio frequency based sensor 104 may be configured to communicate with a sensor reader (not shown in FIG. 1) in a radio frequency range from about 0.01 MHz to about 3000 MHz.

In certain embodiments, commercially available RFID tags may be used to form the radio frequency based sensor 104. These commercially available RFID tags may operate at different frequencies ranging from about 125 kHz to about 2.4 GHz. Suitable RFID tags available from different suppliers and distributors, such as Texas Instruments, TagSys, Digi Key, Fujitsu, Amtel, Hitachi and others, may be used to make the radio frequency based sensor 104. Further, suitable RFID tags may be configured to operate in passive, semi-passive and active modes. It may be noted that the passive RFID tags are not required to be coupled to a power source (for example, a battery) for operation, while the semi-passive and active RFID tags rely on the use of onboard power sources for their operation. Moreover, typically, the RFID tags have a digital ID and a frequency response of corresponding antenna circuit of the RFID tags may be measured as the impedance with real and imaginary parts of the impedance. Further, a sensing or a protection layer may be applied onto the RFID tag and the impedance may be measured as a function of environment in proximity to the resulting sensor. Such sensor is fabricated as described in U.S. patent application Ser. No. 11/259,710 entitled "Chemical and biological sensors, systems and methods based on radio frequency identification" and U.S. patent application Ser. No. 11/259,711. Also, the RFID tag may be a transponder. Further, the RFID tag may be another type of transponder that transmits a predetermined message in response to a predefined received signal. Such RFID tag may include, but is not limited to, one or more RFID tags disclosed in U.S. patent application Ser. No. 11/259,710, entitled "Modified RF Tags and their Applications for Multiplexed Detection" filed on Oct. 26, 2005 and U.S. patent application Ser. No. 11/259,711, entitled "Multivariate Methods of Chemical and Biological Detection Using Radio-Frequency Identification Tags" filed on Oct. 26, 2005, which are hereby incorporated by reference. In one embodiment, the RFID tag may have an analog input into a memory chip associated with the RFID tag. In one embodiment, a separate chemical, biological or physical sensor may be connected to the analog input of the memory chip of RFID tag. In another embodiment, at least one chemical, biological or physical sensor is an integral part of the memory chip of the RFID tag where the sensor part of the RFID tag is fabricated during the fabrication process of the memory chip itself. Memory chips of the RFID tags are fabricated using known integrated circuit fabrication processes and organic electronic fabrication processes.

In embodiments where the radio frequency based sensor 104 is disposable, the radio frequency based sensor 104 and/or the support structure 102 may form detachable portions of a given container. Further, the radio frequency based sensor 104 and/or the support structure 102 may be disposed of or re-used, depending on the application and environment in which they are used. Further, the support structure 102 may be made of materials, such as, but not limited to, plastic, polymer, metal, metal composite, ceramics, or combinations thereof. Primarily, the support structure 102 may be made of a material having a suitable mechanical strength, where the material of the support structure 102 does not adversely interact or affect interrogation or sensor signals.

In one embodiment, the radio frequency based sensor 104 may be gamma-radiation sterilizable to the extent required for pharmaceutical processing (25 kGy to 50 kGy). In particular, the radio frequency based sensor is capable of sensing the parameters even after being exposed to gamma radiation. In one example embodiment, the RFID tags themselves are capable of withstanding gamma radiation without substantive damage to the function of the RFID tags as radio frequency based sensors. It may be noted that conventional RFID tags may not be resistant to gamma radiation. That is, upon exposure to gamma radiation, the stored information in these conventional RFID tags may be completely or partially lost, or undesirably modified to an extent that the stored information may no longer be a true representation of the parameters being monitored. Therefore, such conventional RFID tags are difficult to use in settings that require gamma sterilization. In certain embodiments, the radio frequency based sensors may be made gamma radiation sterilizable as disclosed in U.S. Patent Publication No. 2009/0256679, entitled "RFID based methods and systems for use in manufacturing and monitoring applications" and U.S. Patent Publication No. 2011/0012736, entitled "Methods and systems for sensing upon radiation exposure," and incorporated herein in their entirety.

In some other embodiments, the protection layer may not be employed by the radio frequency based sensor. Further, to enhance sensitivity of the radio frequency based sensors that do not employ protection layers, other structural elements and parameters may be adjusted to enhance sensitivity of the radio frequency based sensors. In an example embodiment, a thickness of a sensor substrate of the radio frequency based sensor may be adjusted to enhance the sensitivity of the radio frequency based sensor. For example, the sensitivity of conductivity measurements with a resonant sensor in the range from about 10 to 200 milli-siemens per centimeter increases with the increase in the thickness of the protection layer for thickness values of the protection layers in a range from about 5 microns to 600 microns and the sensing coil of about 15 millimeters in diameter and having electrode width of about 70-150 millimeters and spacing between electrode turns of about 70-150 millimeters and connected to a memory chip that has about 24 picoFarad capacitance value. Also, the sensitivity of pressure measurements with a resonant sensor with a similar sensing coil increases with the decrease of the gap between the metallic or metallized film and the sensor coil.

In certain embodiments, the radio frequency based sensor 104 may be calibrated after disposing the radio frequency based sensor 104 in the support structure 102. In one example, the radio frequency based sensor 104 may be pre-fitted in the support structure and calibrated after being disposed in the support structure 102. In certain other embodiments, the radio frequency based sensor 104 may be pre-calibrated before disposing the radio frequency based sensor 104 in the support structure 102. Further, in some of these embodiments, the radio frequency based sensor 104 is adapted to be removed from the support structure 102 for additional recalibration or validation. The radio frequency based sensor 104 may be re-calibrated during or after the operation in the container. In one embodiment, post recalibration, the radio frequency based sensor 104 may be installed back in the support structure 102 for the monitoring of the process. However, in another embodiment, where the multivariable sensing device 100 is employed in a single use component, it may not be desired to re-install the radio frequency based sensor 104.

Further, the memory chip 106 may be in operative association with the radio frequency based sensor 104. In some embodiments, the memory chip 106 may be disposed in the support structure 102, on the support structure 102, or on the container. Moreover, the memory chip 106 may be used for storing information. By way of example, the memory chip 106 may be used to store digital information that can be read by the sensor reader. Further, the information stored in the memory chip 106 may be representative of one or more of the radio frequency based sensor 104 and the container. For example, the information stored in the memory chip 106 may be used to identify the container. In one embodiment, the memory chip 106 may be activated by the interrogation signals transmitted from the read/write unit. In some embodiments, the memory chip 106 may be readable throughout the operation of the container. Whereas, in some other embodiments, the memory chip 106 may be readable only during a portion of the operation of the container. In one example, the memory chip 106 may be readable in the beginning of the operation of the containers and may not be readable later on. In some of these embodiments where the memory chip 106 is disposed in the support structure 102, the memory chip may be operatively coupled to the radio frequency based sensor 104. By way of example, the memory chip 106 may be operatively coupled to the radio frequency based sensor 104 to provide calibrating factors to the radio frequency based sensor 104 to facilitate calibration of the radio frequency based sensor 106. In one example, the memory chip 106 may form part of the radio frequency based sensor 104. In embodiments where the memory chip 106 is disposed on the support structure 102 or on the container, the memory chip 106 may or may not be operatively coupled to the radio frequency based sensor 104. By way of example, the memory chip 106 may be coupled to the container and may be used to identify the container. In the illustrated embodiment, the memory chip 106 is disposed on the support structure 102. Further, the memory chip 106 may or may not be operatively coupled to the radio frequency based sensor 104.

Figure 2:
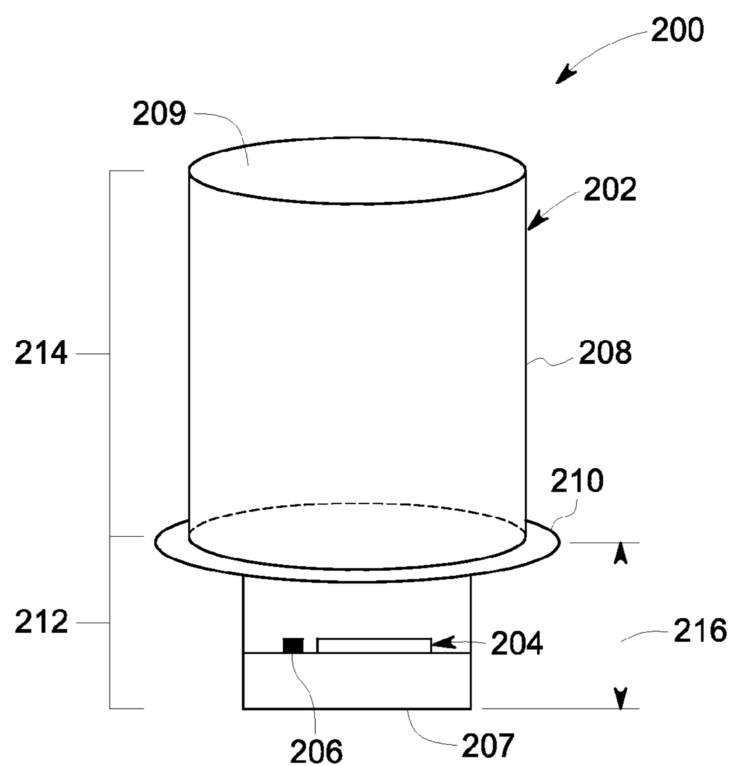
FIG. 2 is a cross-sectional view of a multivariable sensing device having a radio frequency based sensor disposed in a support structure, where the support structure includes a mechanical stopper, in accordance with aspects of the present specification.

FIG. 2 illustrates another exemplary multivariable sensing device 200 of the present specification. In the illustrated embodiment, the multivariable sensing device 200 includes a support structure 202, a radio frequency based sensor 204 and a memory chip 206. In the illustrated embodiment, the memory chip 206 is integral part of the radio frequency based sensor 204.

Further, the support structure 202 includes a body 208 and a projection 210. The body 208 includes a first end 207 and a second end 209. Moreover, the body 208 is configured to receive and retain the radio frequency based sensor 204 at the first end 207. In particular, at least a portion of the radio frequency based sensor 204 is coupled to the first end 207 of the body 208 of the support structure 202. Moreover, the projection 210 is configured to act as a mechanical stopper to restrict entry of a portion of the body 208 of the support structure 202 in the container to a desirable length. Additionally, the projection 210 may also be configured to facilitate physical coupling between the container and the multivariable sensing device 200. By way of example, the projection 210 may be screw fitted or chemically bonded to a portion of the container to provide physical coupling between the support structure 202 and the container. Also, although illustrated as a circular disc with a hollow center, other embodiments of the projection are also envisioned. By way of example, the projection 210 may be in the form of a plurality of discontinuous bars, and the like.

In some embodiments, the body 208 of the support structure 202 may be divided into portions 212 and 214. Further, a cross-sectional area of a portion 212 of the body 208 closer to the first end 207 of the body 208, where the first end 207 is configured to be disposed in the container may be maintained smaller than a cross-section of a portion 214 of the body 208 closer to the second end 209 of the body 208 to limit the amount of length of the body 208 of the support structure 202 that may be disposed in the container. Accordingly, in some embodiments, the body 208 of the support structure 202 may have a uniform cross-section, however, in some other embodiments; the cross-section of the body 208 may vary from one place to another in the body 208. The variation in the cross-section of the cross-section of the body 208 may be in terms of one or both of shape and size.

In certain embodiments, the projection 210 may be configured to define an amount of a length of the body 208 of the support structure 202 that may be disposed in a container (not shown in FIG. 2). In some embodiments the position of the projection 210 on the body 208 may be adjustable. By way of example, a plurality of notches may be provided on the body 208 as provisions to dispose the projection 210 at a desirable distance 216 from the first end 207 of the body 208. The distance 216 between the projection 210 and the first end 207 of the body 208 of the support structure 202 may vary depending on the size and type of container where the radio frequency based sensor 204 is employed.

Figure 3:
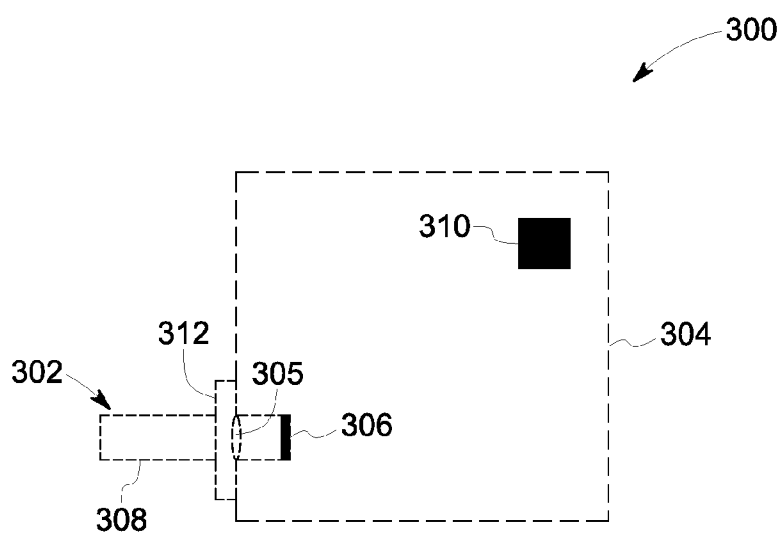
FIG. 3 is a top view of a multivariable sensing device disposed on a container, in accordance with aspects of the present specification.

FIG. 3 is a schematic representation 300 of an exemplary multivariable sensing device 302 employed in a container 304. In one or more non-limiting examples, the container 304 may be a disposable container, a disposable bioprocess component, a bioreactor, a stainless steel container, a plastic container, a polymeric material container, or a pre-sterilized polymeric material container. Further, the container 304 may be of different size and shape, for example, micro fluidic channel, a Petri dish, a glove box, a hood, or a plastic bag. The container 304 may or may not have a predetermined shape.

In some other embodiments, the container 304 may include a disposable bioprocess component, a stainless steel container, a plastic container, a polymeric material container, a chromatography device, a filtration device, a chromatography device with any associated transfer conduits, a filtration device with any associated transfer conduits, centrifuge device, centrifuge device with any associated transfer conduits, a pre-sterilized polymeric material container or any type of container known to those of ordinary skill in the art. Further, non-limiting examples of the disposable bioprocess component include a disposable storage bag, a disposable container, a product transfer line, a filter, a connector, a valve, a pump, a bioreactor, a separation column, a mixer, or a centrifugation system. Further, the disposable bioprocess component may include one or more ports for operatively coupling the multivariable sensing device.

In one embodiment, the container 304 may be made from, materials, such as, but not limited to, a multi-layer film: ethylene vinyl acetate (EVA) low or very low-density polyethylene (LDPE or VLDPE) ethyl-vinyl-alcohol (EVOH) polypropylene (PP), polyethylene, low-density polyethylene, ultra-low density polyethylene, polyester, polyamid, polycarbonate, elastomeric materials all of which are well known in the art. RFID tags typically comprise front antennas and microchip with a plastic backing (e.g., polyester, polyimide etc.), or combinations thereof. Further, the container 304 may also be a vessel that contains a fluid such as liquid or gas, where the vessel can have an input and an output. Further, the container 304 may have a liquid flow or no liquid flow. Furthermore, the container 304 may be a bag or a tube, or pipe, or hose.

In some embodiments, the container 304 may be partly filled with a process fluid, where the solution may be a liquid, fluid or gas, a solid, a paste or a combination of liquid and solid. For example, the solution may be water, a biological buffer, blood, or gas. Further, the container 304 may have a port 305 for inserting the multivariable sensing device 302. In addition, although not illustrated, a plurality of ports for coupling a plurality of multivariable sensing devices is envisioned.

In the illustrated embodiment, the multivariable sensing device 302 includes a radio frequency based sensor 306 disposed in a support structure 308. Further, the multivariable sensing device 302 also includes a memory chip 310. In the illustrated embodiment, the memory chip 310 is disposed outside the support structure 308 and on the container 304. Accordingly, the memory chip 310 of the illustrated embodiment of FIG. 3 may be used to provide identification details for the container 304. However, in embodiments where the memory chip 310 is disposed in the support structure 308, the memory chip 310 may be configured to also provide calibration parameters for the radio frequency based sensor 306. Further, the multivariable sensing device 302 includes a mechanical stopper in the form of a projection 312 to define a portion of the support structure 308 that is disposed in the container 304.

Figure 4:
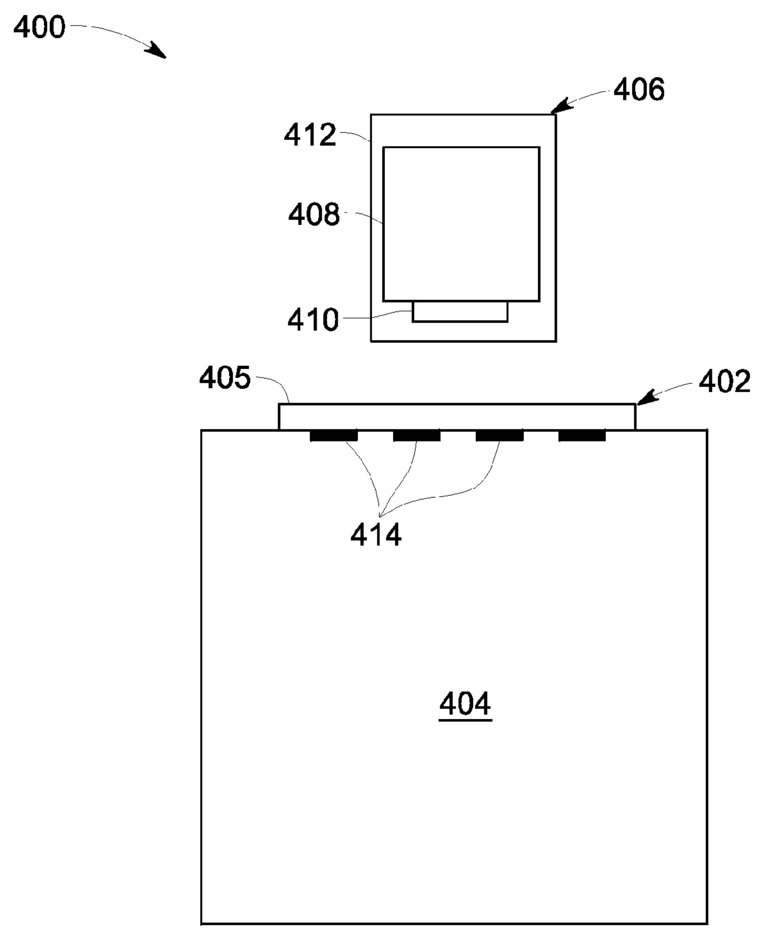
FIG. 4 is a schematic representation of a multivariable sensing system employing a multivariable sensing device having a plurality of radio frequency based sensors and a memory chip, in accordance with aspects of the present specification.

FIG. 4 is a schematic representation of a multivariable sensing system 400 employing a multivariable sensing device 402 operatively coupled to a container 404. Further, the multivariable sensing system 400 also employs a sensor reader 406 in operative association with the multivariable sensing device 402. In the illustrated embodiment, the sensor reader 406 includes reader circuitry 408, a pick-up coil 410 operatively coupled to the reader circuitry 408 and a housing 412. In the illustrated embodiment, at least a portion of the reader circuitry 408 and the pick-up coil 410 is disposed in the housing 412 to provide a mechanical integrity and structure to the sensor reader 406. Further, the pick-up coil 410 may be disposed in the same housing 412 as the reader circuitry 408 and electrically coupled to the reader circuitry 408. Accordingly, in these embodiments, the pick-up coil 410 is part of the sensor reader.

Further, the multivariable sensing device 402 includes radio frequency based sensors 414 operatively coupled to the container 404 to sense one or more parameters of the sample disposed in the container 404. Moreover, the radio frequency based sensors 414 are disposed in a support structure 405. The pick-up coil 410 is part of the sensor reader 406 and configured to relay interrogation signals from the reader circuitry 408 to the radio frequency based sensors 414. Further, the pick-up coil 410 is configured to receive response signals from the radio frequency based sensors 414 and transmit the response signals to the reader circuitry 408. Accordingly, the sensor reader 406 is fashioned to have the pick-up coil 410 as one of the components of the sensor reader 406. The pick-up coil 410 does not form part of the radio frequency based sensors 414. Accordingly, capacitance and inductance associated with the pick-up coil 410 is not present in the radio frequency based sensor 414, thereby, enhancing the sensor response.

Although not illustrated, in some embodiments, two or more sensor readers, such as the sensor reader 406, may be used to sense one or more parameters of the container 404. In some of these embodiments, each sensor reader 406 may have a corresponding pick-up coil 410. In one embodiment, the pick-up coil 410 may be non-disposable in nature. For example, the pick-up coil 410 may be made of metal, or a metallic material that is preferably re-usable for efficiency (of assembling the multivariable sensing device assembly) and/or economic purposes. The pick-up coil 410 may be either fabricated or bought off the shelf. In embodiments where the pick-up coil 410 is fabricated, the pick-up coil 410 may be fabricated employing standard fabrication techniques such as lithography, masking, forming a metal wire in a loop form, or integrated circuit manufacturing processing. For example, the pick-up coil 410 may be fabricated using photolithographic etching of copper-clad laminates, or coiling of copper wire on a form.

Further, the pick-up coil 410 may be electrically coupled to the reader circuitry 408 and/or the housing 412. The pick-up coil 410 may be electrically coupled to receive continuous or intermittent electrical power supply from one or more components of the sensor reader 406, such as, but not limited to, the reader circuitry, an electrical connector, or both. For example, an electrical connector may include standard electronic connectors, such as gold-plated pins. Further, the pick-up coil 410 may be coupled to the reader circuitry and/or the housing in several different ways. For example, the pick-up coil may be attached to the reader circuitry 408 and/or the housing 412 using an adhesive, or by molding the pick-up coil with the housing, or by fastening the pick-up coil to the reader circuitry 408 and/or the housing 412 using screws. Alternatively, holders may be provided in the reader circuitry 408 and/or the housing 412 such that the pick-up coil 410 can rest on the holders in the housing 412.

In operation, signals transmitted by antennae of one or more radio frequency based sensors 414 may be picked up by the pick-up coil 410 of the sensor reader 406. The radio frequency based sensor 414 and the pick-up coil 410 are placed in operative proximity. In one example, the radio frequency based sensor 414 and the pick-up coil 410 may be coupled via inductive coupling or physical electrical connections. In embodiments where the pick-up coil 410 is an independent element or where the pick-up coil 410 is part of the sensor reader 406, the pick-up coil 410 may be operatively coupled to the radio frequency based sensor 414 using wired or wireless connections.

It may be noted that in the illustrated embodiment of FIG. 4, the radio frequency based sensors 414 may include individual memory chips (not shown), or one or more memory chips that are shared by two or more radio frequency based sensors 414. In a particular example, a single memory chip may be shared by the plurality of radio frequency based sensors 414. In this particular example, the single memory chip may be disposed in the support structure 405 in instances where the memory chip is configured to be used for providing calibration parameters during calibration of one or more radio frequency based sensors 414. Further, the single memory chip may be disposed outside the support structure 405, such as the container 404, in instances where the memory chip is used to provide identification parameters, such as an identification code, for the container.

Further, although not illustrated, it may be noted that in some embodiments, the pick-up coil, such as the pick-up coil 410 may be disposed outside the housing 412 of the sensor reader. Further, the pick-up coil 410 may be disposed outside the housing 412 at a location, such that the pick-up coil 410 is operatively coupled to both the radio frequency based sensors 414 of the multivariable sensing device 402 as well as the sensor reader 406.

Figure 5:
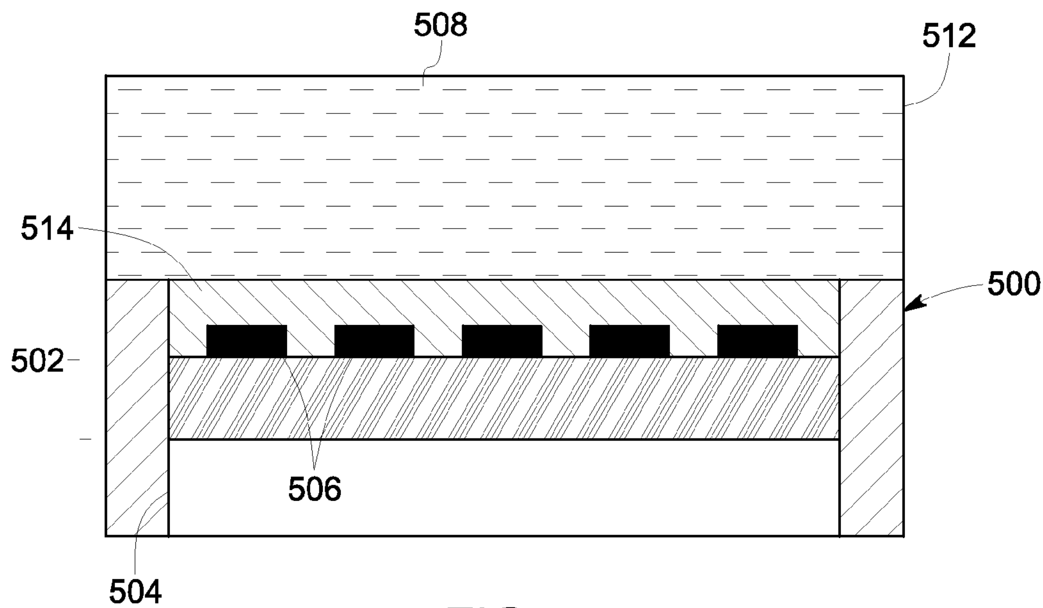
FIG. 5 is a schematic representation of an exemplary multivariable sensing device operatively coupled to a container having a process fluid, where the multivariable sensing device includes a radio frequency based sensor having a sensing coil, a sensor substrate and a protection layer, in accordance with aspects of the present specification.

FIG.S. 5 and 6 illustrate alternate embodiments of multivariable sensing devices of the present specification. FIG. 5 depicts a design of a multivariable sensing device 500, where a radio frequency based sensor 502 of the multivariable sensing device 500 is disposed in a support structure 504 such that a sensing region of the radio frequency based sensor 502 is exposed to a process fluid 508 disposed in a container 512. The sensing region includes coil turns 506. Further, the sensing region may be protected from direct physical contact with the process fluid 508 using a protection layer 514 that may be disposed on at least a portion of the sensing region. In certain embodiments, the protection layer 514 may be a barrier layer, a semi-permeable layer, or a perm-selective layer. This protection layer 514 may be used to prevent components of the radio frequency based sensor 502, such as a sensing coil forming the sensing region from coming in direct physical contact of the solution in the container. Also, the protection layer 514 prevents the solution in the container from being contaminated by any leachable or extractable material that may be present in the radio frequency based sensor 502.

Alternatively, FIG. 6 depicts a design of a multivariable sensing device 600, where a radio frequency based sensor 602 of the multivariable sensing device 600 is disposed in a support structure 604 such that the radio frequency based sensor 602 interacts with a process fluid 608 disposed in a biological container 610 through the sensor substrate 612. The radio frequency based sensor 602 includes a sensing region having coil turns 606. In particular, in the illustrated embodiment of FIG. 6, the radio frequency based sensor 602 is disposed in the support structure 604 such that a sensor substrate 612 of the radio frequency based sensor 602 may be exposed to the process fluid 608 when the support structure 604 is operatively coupled to the biological container 610. Consequently, the sensing region of the radio frequency based sensor 602 may not be in direct physical contact with the process fluid 608 at any time before, during or after operation of the biological container. Further, the sensor substrate 612 of the radio frequency based sensor 602 may be suitable for exposures to the process fluid 608. In some embodiments, the sensor substrate 612 may be made of a polymer material that is not susceptible to chemical reactions with the process fluid 608.

Further, in certain embodiments, a sensing layer 614 may be disposed on at least a portion of the sensor substrate 612 such that in operation, the sensing layer 614 is disposed between the portion of the sensor substrate 612 and the process fluid 608. It may be noted that the sensing layer 614 may be an optional layer. Non-limiting examples of material for the sensing layer may include sulfonated polymer such as Nafion, an adhesive polymer such as silicone adhesive, an inorganic film such as sol-gel film, a composite film such as carbon black-polyisobutylene film, a nanocomposite film such as carbon nanotube-Nafion film, gold nanoparticle-polymer film, metal nanoparticle-polymer film, zeolites, metal-organic frameworks, cage compounds, clathrates, inclusion compounds, electrospun polymer nanofibers, electrospun inorganic nanofibers, electrospun composite nanofibers, and any other sensor material, or combinations thereof.

With returning reference to FIG. 5, in certain embodiments, the configuration of FIG. 5, where the protection layer 514 is employed by the radio frequency based sensors 502 may be desirable in instances where conductivity measurements, temperature measurements, dielectric property measurements, or the like, are to be carried out when there is a need for a protection layer thickness, ranging from 0.5 nanometer to 1000 microns. Alternatively, for solution conductivity, pressure, and other measurements, the configuration of FIG. 6 may be used, where the sensor substrate 612 may be exposed to the process fluid. In this embodiment, the sensor substrate 612 of the radio frequency based sensor 602 may be configured to act as a protection layer for the radio frequency based sensor 602. Non-limiting examples of the material for the sensor substrate may include glass, silicon, silicon nitride, silicon carbide, gallium nitride, alumina, zirconia, or combinations thereof.

FIG. 7 illustrates an exemplary method 700 for using a multivariable sensing device for measuring one or more parameters of contents disposed in the container. At step 702, a support structure having a first end and a second end may be provided, where the first end of the support structure is configured to be coupled to a container. At step 704, one or more radio frequency based sensors are disposed in the support structure to form a multivariable sensing device. Further, the step of disposing the radio frequency based sensors may include the step of bonding or positioning the radio frequency based sensors in the support structure such that the radio frequency based sensors are maintained in their respective positions. In one example, one or more radio frequency based sensors may be disposed in a slot in the support structure configured to receive and hold the radio frequency based sensors. In another example, one or more radio frequency based sensors may be chemically bonded to a wall of the support structure.

The one or more radio frequency based sensors may or may not be pre-calibrated. In embodiments where the radio frequency based sensors are not pre-calibrated, at step 706, the radio frequency based sensors disposed in the support structure may be calibrated. In one embodiment, calibration parameters for calibrating the radio frequency based sensors may be provided by one or more memory chips disposed in the support structure.

At step 708, the multivariable sensing device having the support structure and the radio frequency based sensors may be operatively coupled to a container. In particular, the support structure of the multivariable sensing device may be coupled to a respective port in the container. Further, the support structure may be removably or permanently coupled to the container. It may be noted that the radio frequency based sensors disposed in the support structure may be calibrated before or after coupling the support structure to the container. In one embodiment, the support structure may be coupled to the container by disposing at least a portion of the support structure closer to the first end of the container. Further, in one embodiment, one or more projections may be used to retain the support structure in place with respect to the container.

Optionally, at step 710, if a memory chip is not part of the radio frequency based sensors, a memory chip may be operatively coupled to one or more radio frequency based sensors, the support structure, the container, or combinations thereof. Further, at step 712, the multivariable sensing device and/or the container may be sterilized. For example, the container along with the sensing device may be exposed to gamma radiation for sterilizing.

At step 714, the operation is performed in the container. For example, in case of a bioprocess component, the bioprocessing is carried out. At step 715, before, during and/or after operation in the container, the multivariable sensing device may be used to sense one or more parameters of the container and/or the process fluid disposed in the container. The parameters that may be measured may include physical (temperature, pressure, electrical conductivity), chemical and/or biological parameters.

Moreover, steps 716-720 illustrate optional steps that may be performed if re-calibration or validation of the radio frequency based sensors is required after performing the operation in the container. At step 716, the multivariable sensing device having the support structure and the radio frequency based sensors is removed from the container. Next, at block 718, the sensor is re-calibrated. Subsequently and optionally, the multivariable sensing device is re-fitted in the container (step 720) for further use.

In certain embodiments, a radio frequency based sensor of a multivariable sensing device of the present specification may be configured to monitor one or more impedance spectrum, real part of the impedance spectrum, imaginary part of the impedance spectrum, both real and imaginary parts of the impedance spectrum, frequency of the maximum of the real part of the complex impedance (Fp), magnitude of the real part of the complex impedance (Zp), resonant frequency ($F_1$) and its magnitude ($Z_1$) of the imaginary part of the complex impedance, and anti-resonant frequency ($F_2$) and its magnitude ($Z_2$) of the imaginary part of the complex impedance. Additionally, other parameters of the analog signal may also be measured, for example, quality factor, zero crossing resonance frequency, and the like. Details of such parameters are provided in U.S. Pat. No. 7,911,345, entitled, "Methods and systems for calibration of RFID sensors" and U.S. Pat. No. 8,542,023, entitled, "Highly selective chemical and biological sensors," incorporated here by reference. Individual measured parameters can be further processed in their combinations using well known multivariate techniques, for example principal components analysis, partial least squares, support vector machine, and many others. Further, individual parameters (for example, Fp, Zp) can be also utilized for quantitative measurements. Moreover, these parameters may be measured using an analog portion of response signals of the radio frequency based sensor. The combination of components of sensor circuit result in the generation of an impedance response formed by resonant circuit parameters such as $F_p$, $Z_p$, $F_1$, $F_2$, Fz, $Z_1$, $Z_2$ and some others produced simultaneously from the resonant sensor.

FIG. 8 illustrates examples of real and imaginary portions of the impedance of a single sensor at three different states. Non-limiting examples of the three different states may include three different values of a protection layer, a sensor substrate, or both. As illustrated by curves 802, 804 and 806 real parts of impedance values include parameters $F_p$ 808 and $Z_p$ 810. The parameter $F_p$ 808 represents the frequency of the maximum of the real part of the impedance, and the parameter $Z_p$ 810 represents the magnitude of the real part of the impedance. Similarly, as illustrated by curves 812, 814 and 816, imaginary parts of impedance include $F_1$ 818 and $F_2$ 820. The parameter $F_1$ 818 represents resonant frequency of the imaginary part of the impedance, and the parameter $F_2$ 8200 represents anti-resonant frequency of the imaginary part of the impedance. The parameters $F_1$ 818 and $F_2$ 820 are related to different components of the equivalent circuit. Additional non-limiting examples of the sensor parameters include parameters that can be extracted from the response of the equivalent circuit of the RFID sensor, for example, the quality factor of resonance, phase angle, and magnitude of impedance of the resonance circuit response of the RFID sensor, and others known in the art. The difference between $F_1$ 818 and $F_2$ 820 is related to peak width. In this example, since $F_1$ 818 and $F_2$ 820 are related to different components of an equivalent circuit, $F_1$ 818 and $F_2$ 820 are not correlated. Further, it may be noted that peak symmetry may be affected by changes in impedance. Other parameters that may be measured using the impedance spectrum, may include, a quality factor of resonance, phase angle, and magnitude of impedance, signal magnitude ($Z_1$) 822 at the resonant frequency of the imaginary part of the complex impedance ($F_1$) 818, signal magnitude ($Z_2$) 824 at the anti-resonant frequency of the imaginary part of the complex impedance ($F_2$) 820, and zero-reactance frequency (Fz, frequency at which the imaginary portion of impedance is zero). Multivariable response parameters are described in U.S. patent application Ser. No. 12/118,950 entitled, "Methods and systems for calibration of RFID sensors", which is incorporated herein by reference.

EXAMPLE 1

Conductivity of aqueous solutions was measured over a broad dynamic range using individual using radio frequency based sensors. Further, the radio frequency based sensors were made in the form of a metallic coil disposed on a dielectric substrate. For measurements over a broad range of conductivities, the radio frequency based sensors were coated with corresponding layers of parylene polymer. In particular, three different thicknesses of the protection layers were evaluated using three radio frequency based sensors. The three different thickness values of the parylene polymer were 10 microns, 15 microns, and 25 microns. Further, the protection layers of the radio frequency based sensors were in direct physical contact with a process fluid disposed in a container to which the radio frequency based sensors were operatively coupled. Moreover, sensor readouts for the three different radio frequency based sensors were performed with a pick-up coil positioned at a constant distance from the radio frequency based sensors. The responses of the three radio frequency based sensors were acquired as Fp and Zp responses. Responses Fp and Zp of the three radio frequency based sensors were normalized as represented by Equations (1) and (2) respectively.

$$Fp(\text{normalized})=(Fp-Fp^0)/Fp^0 \quad \text{Equation (1)}$$

$$Zp(\text{normalized})=(Zp-Zp^0)/Zp^0 \quad \text{Equation (2)}$$

where, Fp and Zp are sensor responses measured in water of any conductivity, and $Fp^0$ and $Zp^0$ are sensor responses measured in water of minimal conductivity.

Figure 9:
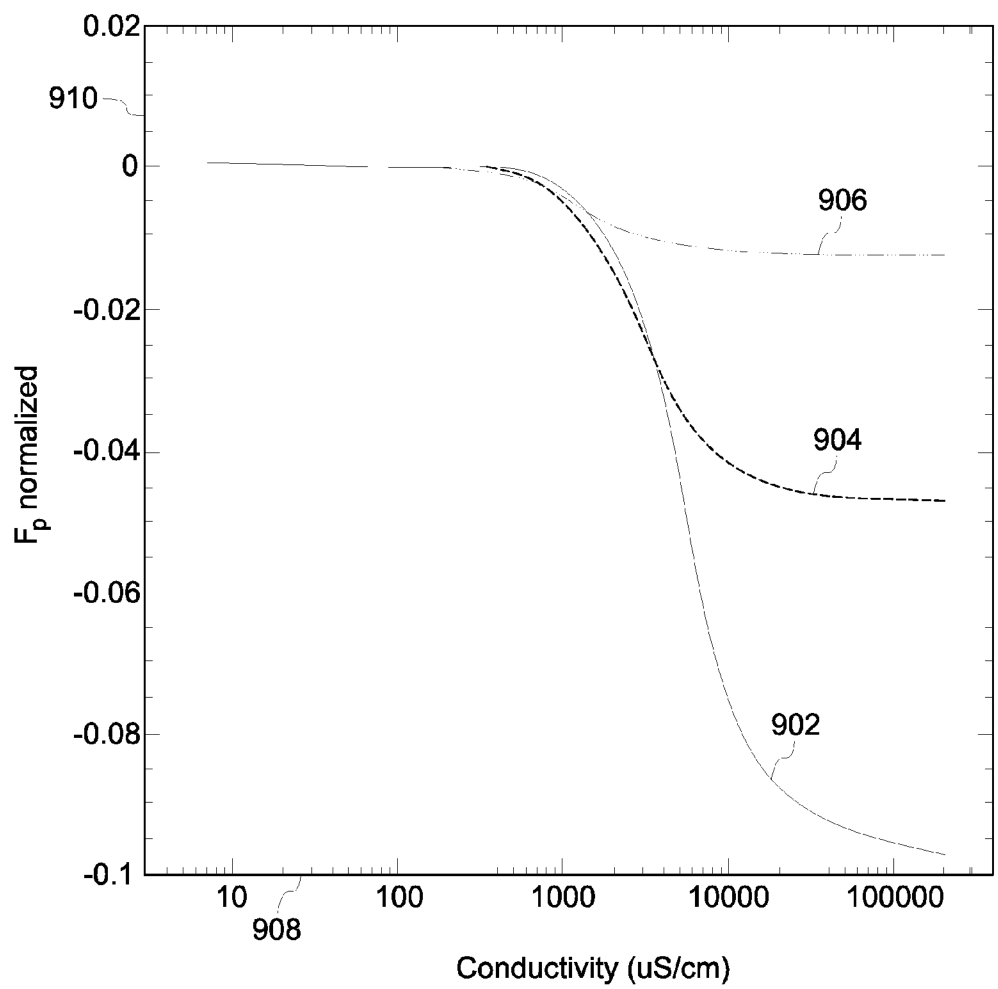
Figure 10:
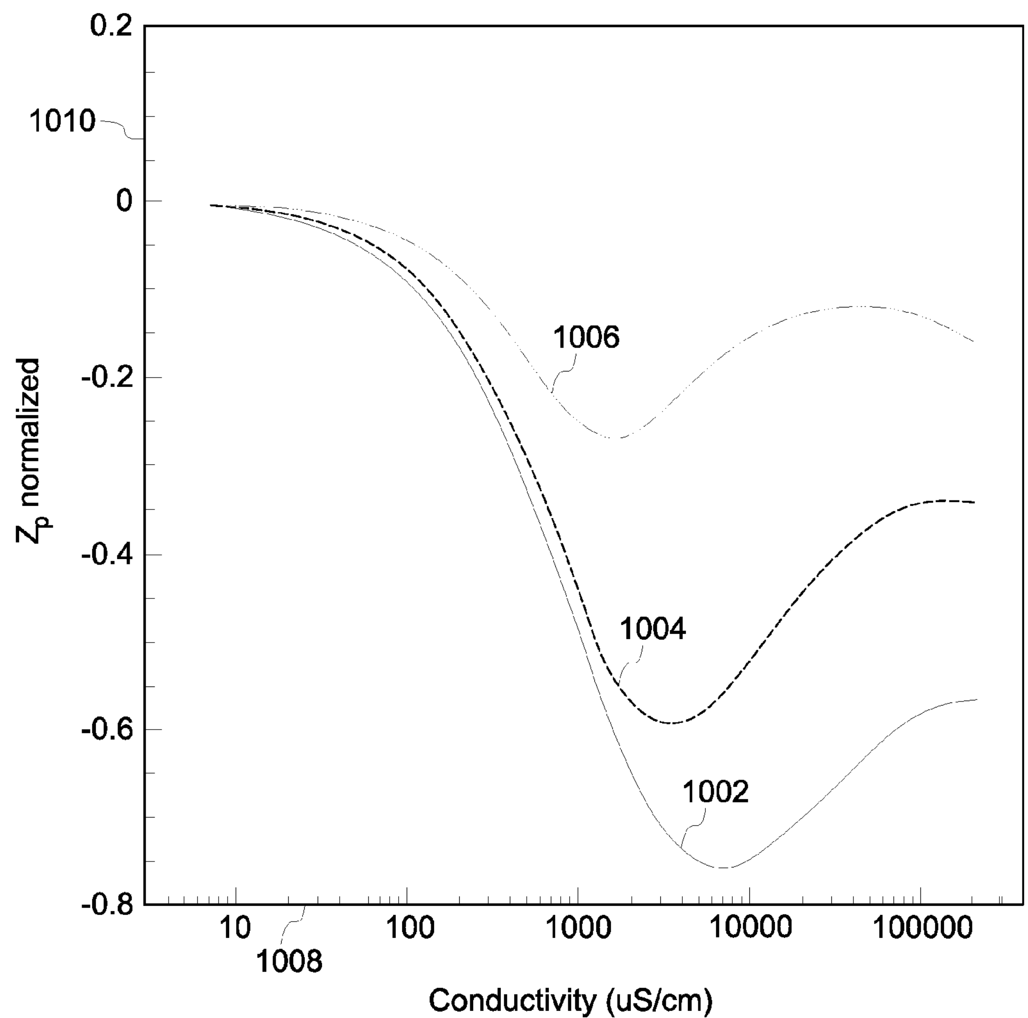

FIG.S. 9-10 depict results of measurements of conductivity of aqueous solutions over a broad dynamic range using the three radio frequency based sensors having the corresponding protection layers (as depicted in FIG. 5) with different thickness values. FIG. 9 depicts normalized Fp responses over solution conductivity for the three radio frequency based sensors. In particular, graph 902 represents normalized Fp response for the radio frequency based sensor having a protection layer with a thickness of about 10 microns. Similarly, graphs 904 and 906 represent normalized Fp responses for the radio frequency based sensors having protection layers having thicknesses of about 15 microns and 25 microns. Further, x-axis 908 represents electrical conductivity of water and y-axis 910 represents normalized Fp values. FIG. 10 depicts normalized Zp responses over solution conductivity for the 3 radio frequency based sensors. Further, graphs 1002, 1004 and 1006 represent normalized Zp responses for the radio frequency based sensors having the protection layers with thickness values of about 10 microns, 15 microns and 25 microns. Further, x-axis 1008 represents electrical conductivity of water and y-axis 1010 represents normalized Zp values.

Electrical conductivity measurements of solutions are known by different methods. For example, sensors with two bare electrodes have been utilized in the past for measurements of solutions of low conductivity. However, using only two bare electrodes did not provide the desirably broad dynamic range of conductivity measurements. Thus, measurements of broad range of conductivities were typically achieved with sensors that were built using four bare electrodes. In particular, sensors with four bare electrodes were built where a voltage drop across two inner electrodes was monitored while an alternating current was applied over the two outer electrodes. However, the bare electrodes are well known to be affected by the high conductivity solutions if the bare electrodes are exposed for relatively long periods of time (for example, few hours or days), thereby causing sensor drift due to the deposits or corrosion of the bare electrodes. To address this problem of instability of the bare electrodes, inductive toroidal sensors were introduced. These sensors were made of two toroidal coils protected from a solution with a dielectric material. In these sensors, one coil was used to produce an electric field into a solution. Further, the generated ionic current was monitored by the second coil. The key advantage of the sensors with the toroidal coils was the enhanced sensor stability because there were no bare electrodes in contact with solution. However, the limitation of the inductive toroidal sensors is their ability to measure only high solution conductivity. The radio frequency based sensors having a protection layer are configured to overcome at least some or all of the limitations of other known conductivity sensors and measure solution conductivity over the broad range without the need for a direct physical contact between the bare electrodes with the process fluid.

EXAMPLE 2

Conductivity of aqueous solutions was further measured over a broad dynamic range using individual using radio frequency based resonant sensors each having a protection layer (as depicted in FIG. 5) that has a thickness value different from protection layers of the other radio frequency based sensors. Further, the radio frequency based sensors as described in Example 1 were used for comparison. The sensitivity of the radio frequency based sensors was measured as Zp responses. Also, the sensitivity was compared in the range of high conductivity (about 50-200 mS/cm).

Comparative study was performed for the radio frequency based sensors that had the protection layers of different thickness values (x-axis 1102) ranging from about 10 microns to 85 microns with respect to sensitivity (y-axis 1104) of the individual radio frequency based sensors. Further, FIG. 11 depicts different sensitivity values (1106) of the individual radio frequency based sensors represented as sensor signal in normalized values of Zp as defined in Example 1 and taken as part-per-million (ppm) values per unit of solution conductivity (mS/cm). It may be noted that absolute values of the sensitivity values are considered while deriving a relationship between the thickness values of the protection layer and the conductivity. By way of example, a sensitivity values represented as −200 and +200 on the y-axis 1104 were considered as 200 for studying the effect of thickness of the protection layer on the sensitivity of the conductor. The comparative study showed that the most sensitive radio frequency based sensor with its largest absolute values of sensitivity over the tested solution conductivity range was the sensor with the highest value of thickness for the protection layer.

EXAMPLE 3

Conductivity of aqueous solutions was further measured over a broad dynamic range using individual radio frequency based sensors, each radio frequency based sensor having a sensor substrate. Further, the radio frequency based sensors were operatively coupled to a process fluid or aqueous solutions such that the respective sensor substrates were in direct physical contact with the process fluid (as depicted in FIG. 6). Moreover, the different radio frequency based sensors had sensor substrates with different thickness values. The radio frequency based sensors included a metallic coil deposited on alumina ($Al_2O_3$) substrates of 150 microns and 300 microns thickness. Responses Fp and Zp of the radio frequency based sensors were normalized as described in Example 1.

Figure 12:
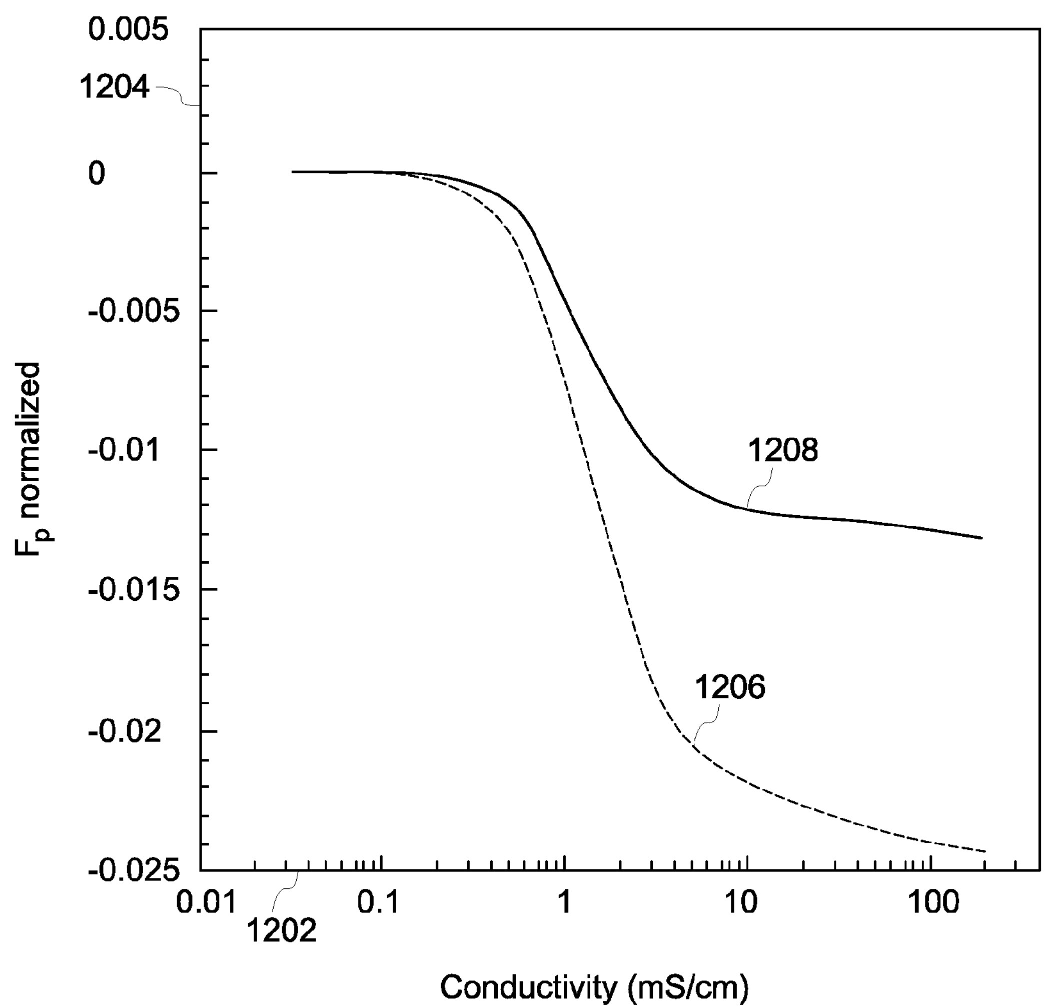
Figure 13:
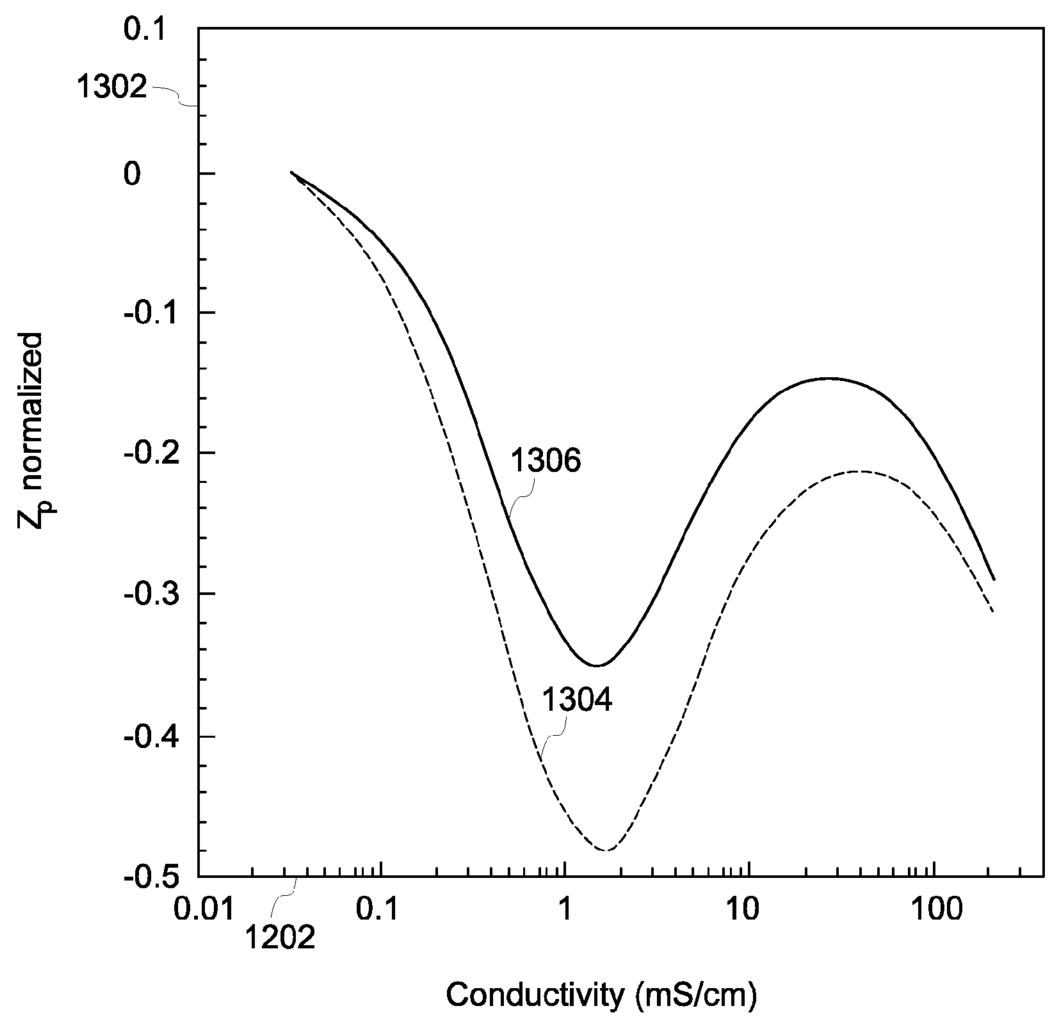

FIG.S. 12-13 depict results of measurements of solution conductivity (x-axis 1202) of aqueous solutions over a broad dynamic range using individual radio frequency based sensors protected with a dielectric layer of different thickness that also served as a sensor substrate. In particular, FIG. 12 depicts normalized Fp responses (y-axis 1304) over solution conductivity, and FIG. 13 depicts normalized Zp (y-axis 1302) responses with respect to the solution conductivity. In FIG. 12, graphs 1206 and 1208 represent Fp responses for radio frequency based sensors having substrates that have thickness values of about 150 microns and 300 microns, respectively. Further, in FIG. 13, graphs 1304 and 1306 represent Zp responses for radio frequency based sensors having substrates that have thickness values of about 150 microns and 300 microns, respectively.

Advantageously, the multivariable sensing device and the multivariable sensing device assembly may be employed in new and existing systems with ease. Moreover, the current configuration enables the radio frequency based sensor to be easily operatively coupled to a container. Additionally, two or more such radio frequency based sensors may be read using a single pick-up coil. Further, absence of the pick-up coil from the structure of the radio frequency based sensor results in simplification of the design of the multivariable sensing device. Moreover, absence of the pick-up coil from the structure of the multivariable sensing device reduces the cost of the multivariable sensing device.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A multivariable sensing device for sensing one or more parameters of a process fluid disposed in a container, comprising:

- a radio frequency based sensor configured to sense a physical parameter, a chemical parameter, a biological parameter, or combinations thereof, representative of the process fluid, wherein the radio frequency based sensor comprises:
  - a sensor substrate;
  - a radio frequency coil disposed on at least a portion of the sensor substrate; and
- a support structure configured to be physically coupled to the container, wherein the support structure is configured to position the radio frequency based sensor in operative proximity to an inside of the container;
- a pick-up coil disposed outside the support structure and coupled to the radio frequency based sensor; wherein the pick-up coil transmits said one or more parameters to a sensor reader; and wherein the sensor reader operatively coupled to the radio frequency based sensor.

2. The multivariable sensing device of claim 1, wherein the radio frequency based sensor is disposed in the support structure such that at least a portion of the sensor substrate faces the inside of the container.

3. The multivariable sensing device of claim 2, further comprising a sensing layer disposed on at least a portion of the sensor substrate.

4. The multivariable sensing device of claim 1, wherein the radio frequency based sensor is disposed in the support structure such that at least a portion of the radio frequency coil faces the inside of the container.

5. The multivariable sensing device of claim 4, further comprising a protection layer disposed on at least a portion of the radio frequency coil.

6. The multivariable sensing device of claim 1, wherein at least one of the radio frequency based sensor and the support structure is disposable.

7. The multivariable sensing device of claim 1, wherein the radio frequency based sensor is removably disposed in the support structure.

8. The multivariable sensing device of claim 1, wherein the container is a disposable bioprocess component.

9. The multivariable sensing device of claim 8, wherein the bioprocess component comprises one or more of a storage bag, a transfer line, a filter, a connector, a valve, a pump, a bioreactor, a separation column, or combinations thereof.

10. The multivariable sensing device of claim 1, wherein the radio frequency based sensor is gamma-radiation sterilizable.

11. The multivariable sensing device of claim 1, wherein the support structure comprises a body and a projection mechanically coupled to the body, and wherein the body is configured to receive the radio frequency based sensor.

12. The multivariable sensing device of claim 1, wherein the radio frequency based sensor does not comprise a pick-up coil.

13. A method for multivariable sensing for a process fluid disposed in a container, comprising:

operatively coupling a radio frequency based sensor to a support structure to form a multivariable sensing device, wherein the radio frequency based sensor comprises:

a sensor substrate;

a radio frequency coil disposed on at least a portion of the sensor substrate;

operatively coupling the multivariable sensing device to the container;

providing a sensor reader operatively coupled to the radio frequency based sensor;

providing a pick-up coil disposed outside the support structure;

operatively coupling the pick-up coil to the radio frequency based sensor;

sensing one or more parameters from the container;

transmitting data representative of the one or more parameters to the sensor reader using the pick-up coil; and determining one or more parameters associated with the process fluid disposed in the container.

14. The method of claim 13, further comprising calibrating the radio frequency based sensor before or after disposing the radio frequency based sensor in the support structure.

15. The method of claim 14, further comprising sterilizing the container and the multivariable sensing device coupled to the container prior to operatively coupling the multivariable sensing device to the container.

16. The method of claim 15, wherein the step of sterilizing comprises sterilizing using gamma radiation.

17. The method of claim 13, further comprising decoupling the support from the container.

18. The method of claim 17, further comprising recalibrating the radio frequency based sensor, and re-coupling the support of the multivariable sensing device to the container for further use.

* * * * *